United States Patent [19]

Hirota et al.

[11] Patent Number: 4,626,927

[45] Date of Patent: Dec. 2, 1986

[54] RECORDING AND REPRODUCING APPARATUS FOR RECORDING AND REPRODUCING A CARRIER CHROMINANCE SIGNAL WITH PRE-EMPHASIS AND DE-EMPHASIS

[75] Inventors: Akira Hirota, Chigasaki; Takuya Tsushima, Ayase; Nobuyoshi Suzuki, Yokohama, all of Japan

[73] Assignee: Victor Company of Japan, Ltd., Yokohama, Japan

[21] Appl. No.: 634,407

[22] Filed: Jul. 25, 1984

[30] Foreign Application Priority Data

Jul. 29, 1983 [JP] Japan ................................. 58-138872

[51] Int. Cl.⁴ ........................ H04N 5/76; H04N 9/493
[52] U.S. Cl. ................................... 358/310; 358/315; 358/340; 358/36
[58] Field of Search ............... 358/310, 314, 315, 316, 358/328, 329, 336, 340, 36, 37, 166, 167; 360/33.1

[56] References Cited

U.S. PATENT DOCUMENTS

| | | | |
|---|---|---|---|
| 4,007,483 | 2/1977 | van Cang | 358/330 X |
| 4,198,650 | 4/1980 | Hongu | 358/315 X |
| 4,200,889 | 4/1980 | Strobele | 360/65 X |
| 4,281,346 | 7/1981 | Strobele | 358/166 |

*Primary Examiner*—Robert L. Richardson
*Attorney, Agent, or Firm*—Michael N. Meller

[57] ABSTRACT

A recording and reproducing apparatus for recording a carrier chrominance signal, comprises a separating circuit for separating a carrier chrominance signal from a color video signal, a recording signal processing circuit for converting the carrier chrominance signal into a carrier chrominance signal having a signal format suited for recording and reproduction, a recording circuit for recording an output signal of the recording signal processing circuit on a recording medium, a reproducing circuit for reproducing the recorded signal from the recording medium, a reproduced signal processing circuit for converting the reproduced signal from the reproducing circuit into a reproduced carrier chrominance signal having an original signal format, and a de-emphasis circuit responsive to the reproduced carrier chrominance signal from the reproduced signal processing circuit, for subjecting the reproduced carrier chrominance signal to a de-emphasis so that a high-frequency component in a vertical spatial frequency of the reproduced carrier chrominance signal is relatively attenuated compared to a low-frequency component of the reproduced carrier chrominance signal.

10 Claims, 27 Drawing Figures

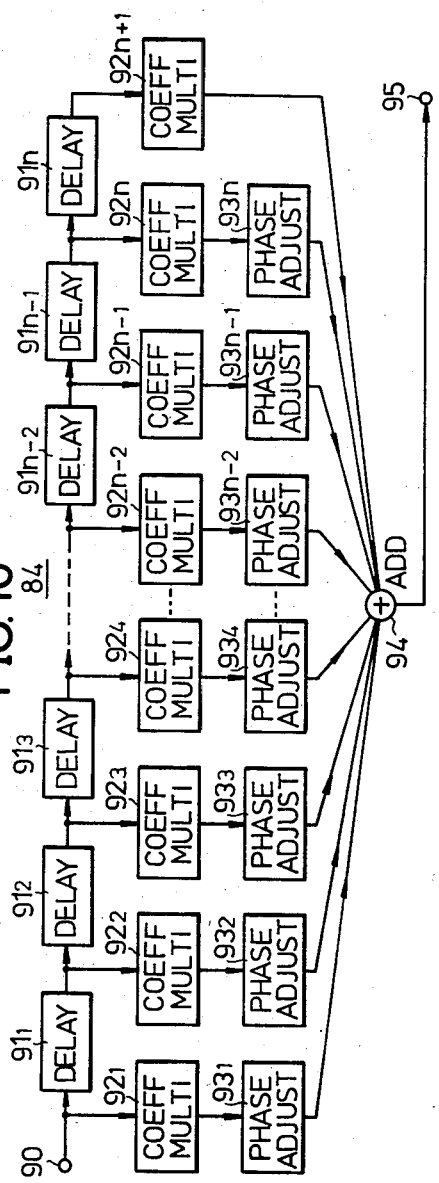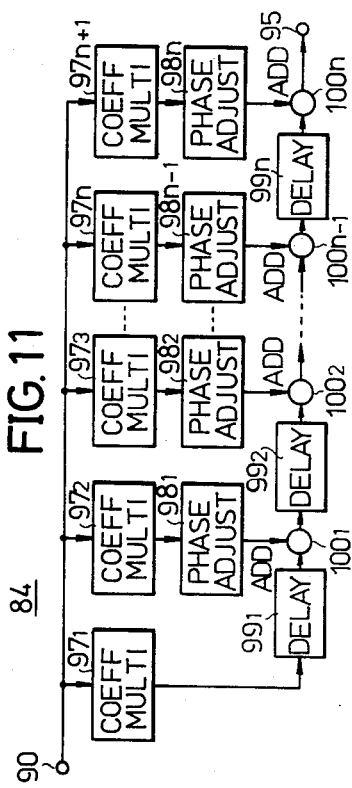

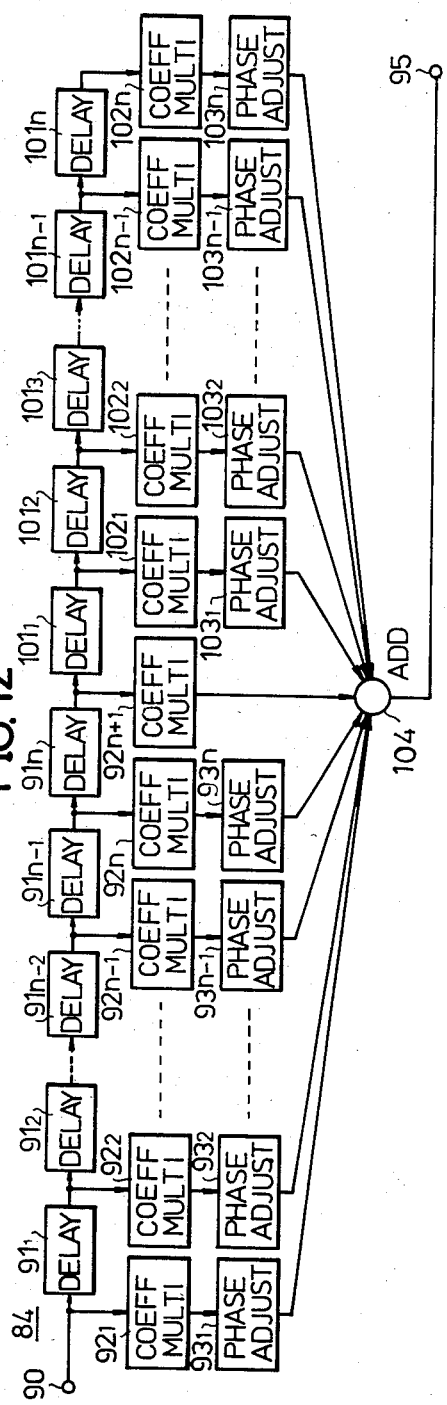
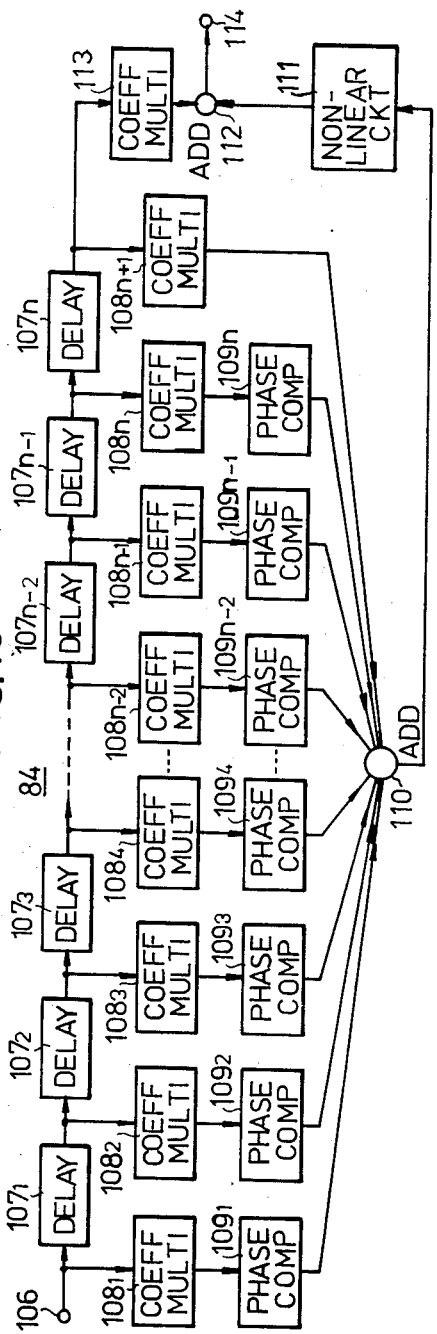

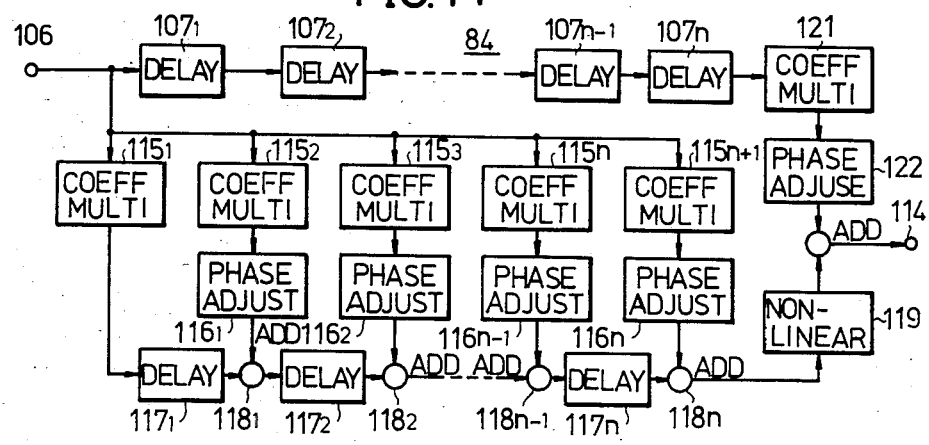
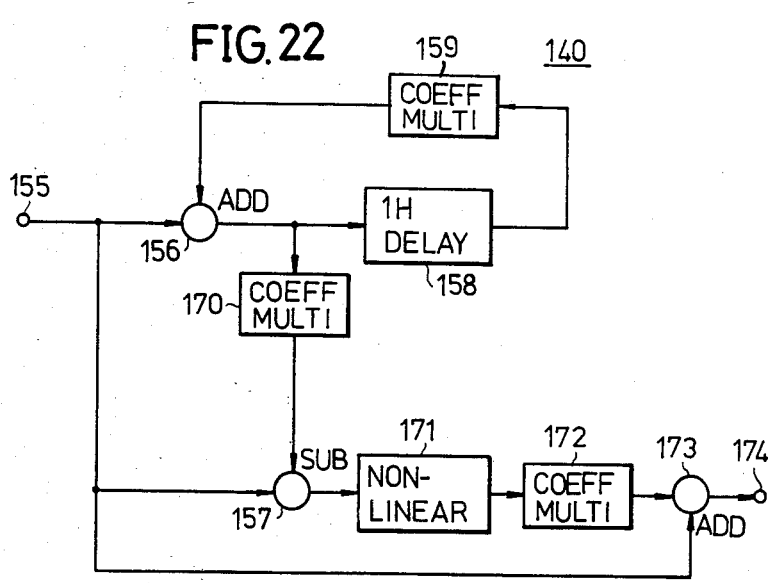

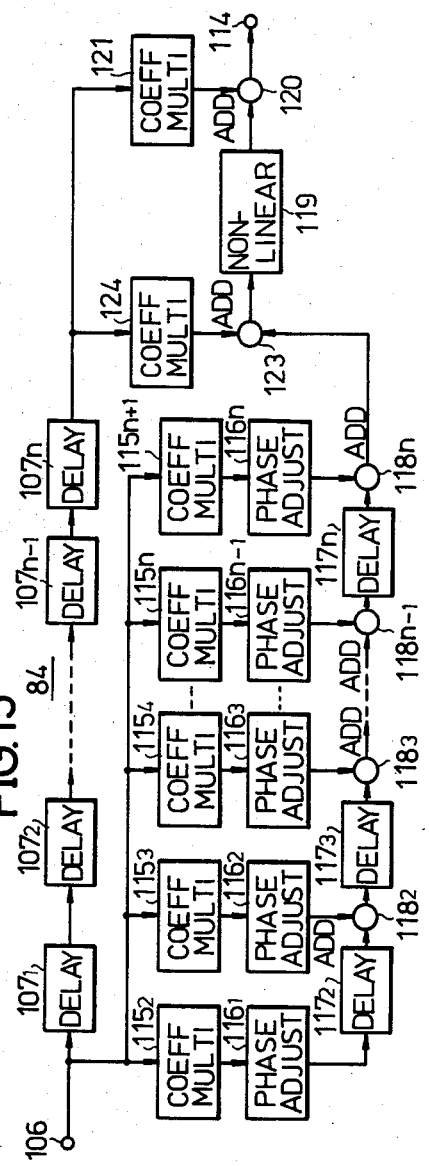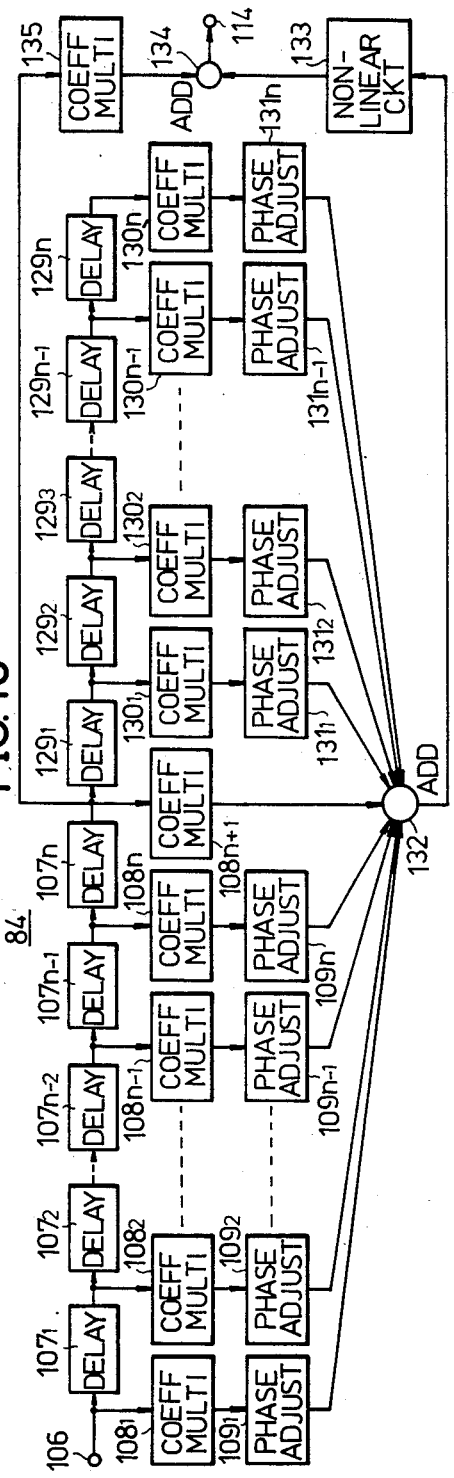

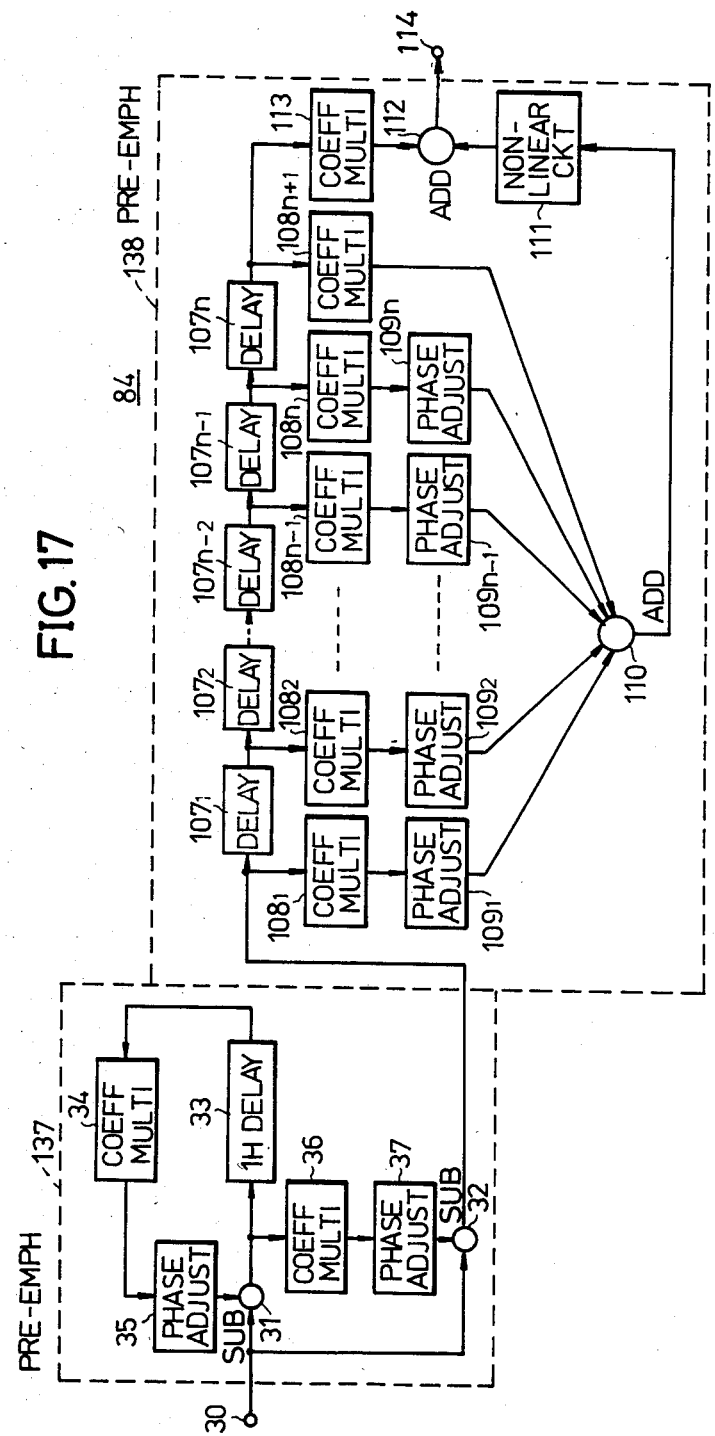

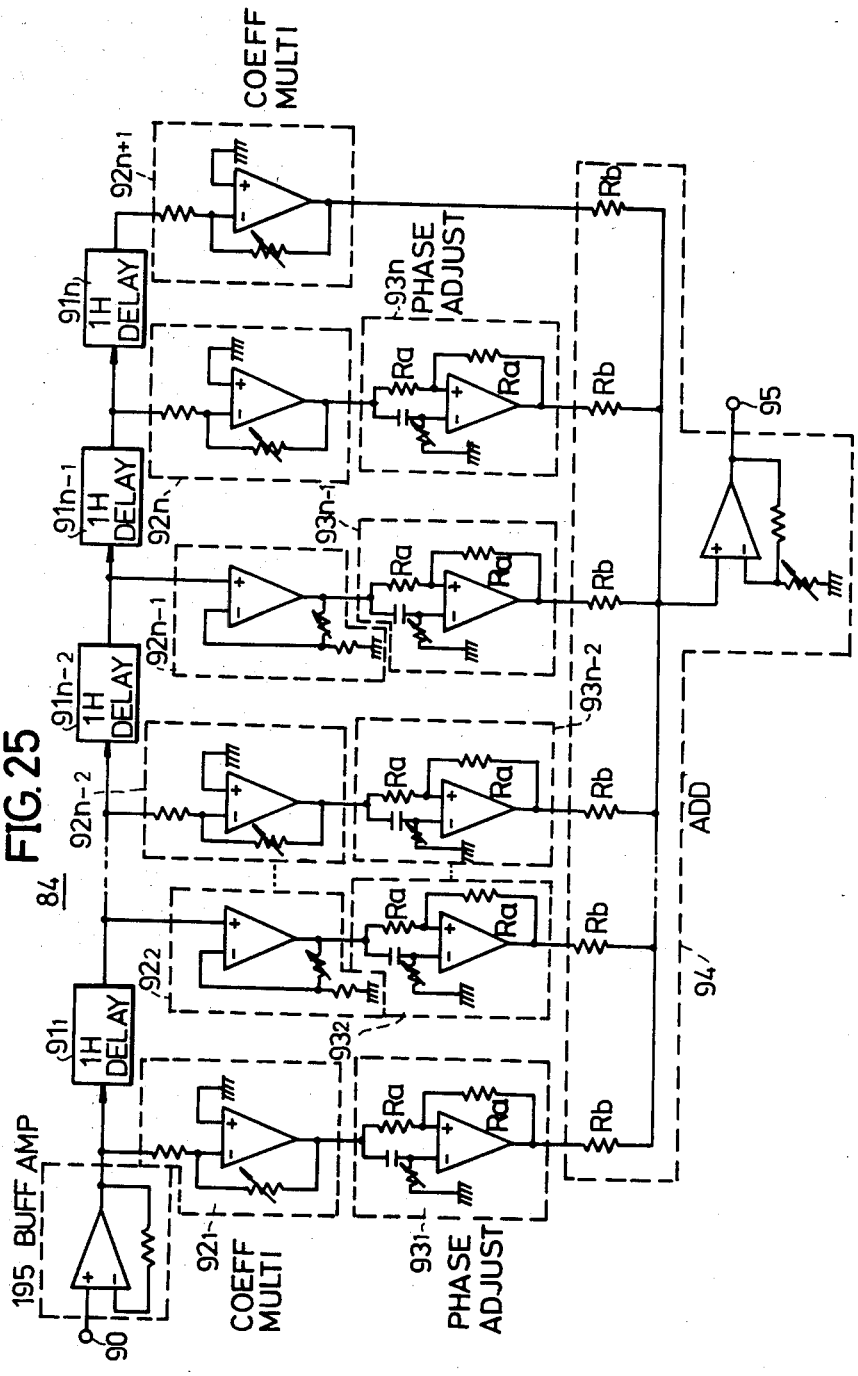

RECORDING AND REPRODUCING APPARATUS FOR RECORDING AND REPRODUCING A CARRIER CHROMINANCE SIGNAL WITH PRE-EMPHASIS AND DE-EMPHASIS

BACKGROUND OF THE INVENTION

The present invention generally relates to recording and reproducing apparatuses for recording and reproducing a carrier chrominance signal, and more particularly to a recording and reproducing apparatus which records onto a magnetic recording medium a carrier chrominance signal which is directly subjected to a pre-emphasis or a carrier chrominance signal which is frequency-converted into a low frequency band before being subjected to the pre-emphasis, and subjects a reproduced carrier chrominance signal or a reproduced frequency converted carrier chrominance signal to a de-emphasis at the time of the reproduction, so as to obtain a reproduced carrier chrominance signal or a reproduced frequency converted carrier chrominance signal which has reduced noise and has an original waveform.

In a known recording and reproducing apparatus such as a video tape recorder (VTR), a standard system color video signal which is to be recorded, is separated into a luminance signal and a carrier chrominance signal. The separated luminance signal is frequency-modulated, and the separated carrier chrominance signal is frequency-converted into a frequency band which is lower than the frequency band of the frequency modulated luminance signal. The frequency modulated luminance signal and the frequency converted carrier chrominance signal are subjected to a frequency-division-multiplexing, and a frequency-division-multiplexed signal is recorded on a magnetic recording medium. At the time of the reproduction, the a reproduced frequency modulated luminance signal and a reproduced frequency converted carrier chrominance signal are separated from a signal which is reproduced from the recording medium. The reproduced frequency modulated luminance signal and the reproduced carrier chrominance signal are independently subjected to a predetermined signal processing, so as to obtain a reproduced luminance signal and a reproduced carrier chrominance signal in the respective original frequency bands. The reproduced luminance signal and the reproduced carrier chrominance signal are multiplexed to obtain a reproduced color video signal. In such a recording and reproducing apparatus, a noise reduction is sometimes carried out with respect to the carrier chrominance signal by use of the line correlation, similarly as in the case of the noise reduction carried out with respect to the luminance signal. The line correlation normally exists for the reproduced carrier chrominance signal, but the line correlation does not exist for essentially all of the noise mixed into the reproduced carrier chrominance signal. By noting that the noise has no line correlation, the noise can be obtained by passing the reproduced carrier chrominance signal through a 1H delay circuit and mixing the input and output signals of this 1H delay circuit, where H represents one horizontal scanning period. It is thus possible to obtain a reproduced carrier chrominance signal in which the noise is reduced.

However, in the conventional recording and reproducing apparatus having a noise reduction circuit for carrying out the noise reduction described above, a signal component of the reproduced carrier chrominance signal having no line correlation is also reduced together with the noise. For this reason, there is a problem in that the vertical spatial frequency characteristic (that is, the vertical resolution) becomes poor when such a noise reduction circuit is employed.

SUMMARY OF THE INVENTION

Accordingly, it is a general object of the present invention to provide a novel and useful recording and reproducing apparatus for recording and reproducing a carrier chrominance signal, in which the problem described before is eliminated.

Another and more specific object of the present invention is to provide a recording and reproducing apparatus which records on a recording medium an output carrier chrominance signal of a pre-emphasis circuit which has a linear pre-emphasis characteristic for relatively emphasizing the level of a high-frequency component in a vertical spatial frequency of a carrier chrominance signal compared to a low-frequency component, and obtains a reproduced carrier chrominance signal at the time of the reproduction by passing a reproduced carrier chrominance signal which is reproduced from the recording medium through a de-emphasis circuit which has a linear de-emphasis characteristic complementary to the linear pre-emphasis characteristic of the pre-emphasis circuit. By "linear emphasis", it means that the pre-emphasis or de-emphasis is performed with respect to the carrier chrominance signal with the same pre-emphasis or de-emphasis characteristic regardless of the level of the carrier chrominance signal. According to the recording and reproducing apparatus of the present invention, it is possible to improve the signal-to-noise (S/N) ratio of the reproduced carrier chrominance signal, because the de-emphasis is performed at the time of the reproduction with respect to the vertical spatial frequency of the reproduced carrier chrominance signal. In addition, since the carrier chrominance signal which is reproduced, is a carrier chrominance signal which is passed through the pre-emphasis circuit having the pre-emphasis characteristic complementary to the de-emphasis characteristic of the de-emphasis circuit so that the level of the high-frequency component in the vertical spatial frequency of the carrier chrominance signal is emphasized before being recorded, the vertical spatial frequency characteristic (vertical resolution) will not be deteriorated due to the de-emphasis as in the case of the conventional noise reduction circuit which uses the line correlation.

Still another object of the present invention is to provide a recording and reproducing apparatus which records on a recording medium an output carrier chrominance signal of a pre-emphasis circuit which has a non-linear pre-emphasis characteristic for relatively emphasizing the level of a high-frequency component in a vertical spatial frequency of a carrier chrominance signal compared to a low-frequency component, and obtains a reproduced carrier chrominance signal at the time of the reproduction by passing a reproduced carrier chrominance signal which is reproduced from the recording medium through a de-emphasis circuit which has a non-linear de-emphasis characteristic complementary to the non-linear pre-emphasis characteristic of the pre-emphasis circuit. By "non-linear emphasis", it means that the pre-emphasis or de-emphasis is performed with respect to the carrier chrominance signal with the pre-emphasis or de-emphasis characteristic which is dependent on the level of the carrier chrominance signal. According to the recording and reproducing apparatus of the present invention, the pre-emphasis is not performed to a large extent with respect to the carrier chrominance signal having a large level, and it is possible to reduce the overshoot quantity due to the pre-emphasis. Further, because the overshoot quantity can be reduced, deterioration in the S/N ratio, moire, or the like due to the cross modulation of a luminance signal which is multiplexed with the carrier chrominance signal and transmitted, will essentially not occur. Thus, it is possible to improve the S/N ratio of the reproduced carrier chrominance signal. In addition, in the case where only one of the non-linear pre-emphasis circuit and the non-linear de-emphasis circuit is provided in the recording and reproducing apparatus, the carrier chrominance signal which is frequency-converted into the low frequency band, will not be recorded and reproduced with the level thereof emphasized to a large extent. Hence, even when the carrier chrominance signal which is reproduced from a magnetic tape which is pre-recorded by an existing VTR, is passed through the non-linear pre-emphasis circuit, the reproduced carrier chrominance signal will have the original signal waveform, and there will be no problem from the practical point of view. On the other hand, when a magnetic tape recorded by the recording and reproducing apparatus according to the present invention is played on the existing VTR, the reproduced carrier chrominance signal will also have the original signal waveform. Therefore, it is possible to maintain compatibility between the existing VTR and the recording and reproducing apparatus according to the present invention.

A further object of the present invention is to provide a recording and reproducing apparatus in which delay circuits used in the pre-emphasis circuit and the de-emphasis circuit, are each constituted by a charge transfer element such as a charge coupled device (CCD), and a circuit for generating clock pulses for controlling the charge transfer element in synchronism with a horizontal synchronizing signal which is recorded and reproduced. According to the recording and reproducing apparatus of the present invention, the delay time may be expanded or compressed according to the time base deviation in the reproduced carrier chrominance signal. Thus, it is possible to accurately match the phases of input signals of a circuit which adds input and output signals of the delay circuit. Therefore, it is possible to further improve the S/N ratio of the reproduced frequency converted carrier chrominance signal, and further improve the reproducibility of the original signal waveform of the carrier chrominance signal.

Other objects and further features of the present invention will be apparent from the following detailed description when read in conjunction with the accompanying drawings.

BRIEF DESCRIPTION OF THE DRAWINGS

FIG. 10 is a systematic block diagram showing a first embodiment of a pre-emphasis circuit in the block system shown in FIG. 9;

FIG. 11 is a systematic block diagram showing a second embodiment of the pre-emphasis circuit in the block system shown in FIG. 9;

FIG. 12 is a systematic block diagram showing a third embodiment of the pre-emphasis circuit in the block system shown in FIG. 9;

FIG. 13 is a systematic block diagram showing a fourth embodiment of the pre-emphasis circuit in the block system shown in FIG. 9;

FIG. 14 is a systematic block diagram showing a fifth embodiment of the pre-emphasis circuit in the block system shown in FIG. 9;

FIG. 15 is a systematic block diagram showing a sixth embodiment of the pre-emphasis circuit in the block system shown in FIG. 9;

FIG. 16 is a systematic block diagram showing a seventh embodiment of the pre-emphasis circuit in the block system shown in FIG. 9;

FIG. 17 is a systematic block diagram showing an eighth embodiment of the pre-emphasis circuit in the block system shown in FIG. 9;

FIG. 22 is a systematic block diagram showing a second embodiment of the pre-emphasis circuit in the block system shown in FIG. 19;

FIG. 25 is a concrete circuit diagram showing an embodiment of the pre-emphasis circuit shown in FIG. 10;

DETAILED DESCRIPTION

Figure 1:
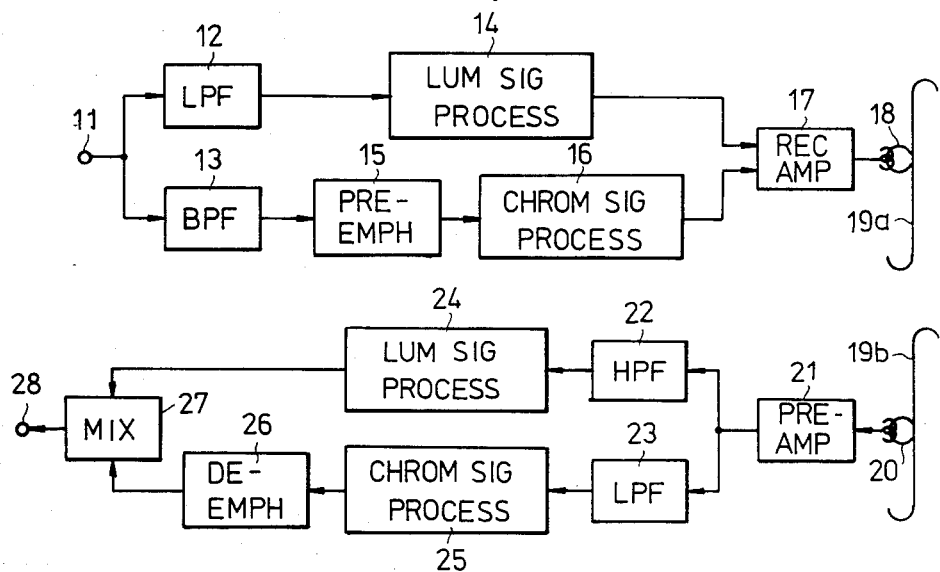
FIG. 1 is a systematic block diagram showing a first embodiment of a recording and reproducing apparatus according to the present invention.

In FIG. 1, a standard television system (NTSC system or PAL system) color video signal is applied to an input terminal 11. The color video signal is supplied to a lowpass filter 12 wherein a luminance signal is separated, and to a bandpass filter 13 wherein a carrier chrominance signal is separated. The separated luminance signal from the lowpass filter 12, is supplied to a luminance signal processing circuit 14 wherein the luminance signal is subjected to a predetermined signal processing such as a frequency modulation, for example. The construction of the luminance signal processing circuit 14 itself is known in a VTR. On the other hand, the separated carrier chrominance signal from the bandpass filter 13, is supplied to a pre-emphasis circuit 15 wherein the carrier chrominance signal is subjected to a linear pre-emphasis which will be described later on in the specification in detail. The linear pre-emphasis is performed with respect to every signal component which appears in the vertical direction of the picture with an interval of one horizontal scanning period (1H). Thus, the carrier chrominance signal is pre-emphasized so that a high-frequency component in the vertical spatial frequency of the carrier chrominance signal is relatively emphasized compared to the low-frequency component. By "linear pre-emphasis", it means that the pre-emphasis is performed with respect to the carrier chrominance signal with a vertical spatial frequency versus level characteristic (pre-emphasis characteristic) which is independent of the level of the carrier chrominance signal. The pre-emphasized carrier chrominance signal is supplied to a carrier chrominance signal processing circuit 16. The construction of the carrier chrominance signal processing circuit 16 itself is known in the VTR. In the carrier chrominance signal processing circuit 16, the pre-emphasized carrier chrominance signal is frequency-converted into a frequency band which is lower than the frequency band of the frequency modulated luminance signal, and is converted into a predetermined signal format by being subjected to a known phase shift process disclosed in the U.S. Pat. No. 4,178,606 in which the assignee is the same as the assignee of the present application or the British Patent No. 2,040,135 in which the applicant is the same as the assignee of the present application. The phase shift process is performed in order to eliminate the undesirable effects of crosstalk from a track which is adjacent to the track which is actually being scanned. The frequency modulated luminance signal from the luminance signal processing circuit 14 and the frequency converted carrier chrominance signal from the carrier chrominance signal processing circuit 16, are respectively supplied to a recording amplifier 17 wherein the signals are mixed and amplified. The mixed signal from the recording amplifier 17 is recorded on a magnetic tape 19a by a recording rotary head 18.

On the other hand, at the time of the reproduction, the recorded signal on a magnetic tape 19b, which is the same as the signal recorded on the magnetic tape 19a, is reproduced by a reproducing rotary head 20. The reproduced signal from the reproducing rotary head 20 is passed through a pre-amplifier 21, and is supplied to a highpass filter 22 and to a lowpass filter 23. The frequency modulated luminance signal within the reproduced signal is separated in the highpass filter 22, and the separated frequency modulated luminance signal is supplied to a luminance signal processing circuit 24 wherein the frequency modulated luminance signal is demodulated into a reproduced luminance signal in the original frequency band. The construction of the luminance signal processing circuit 24 itself is known in the VTR. On the other hand, the frequency converted carrier chrominance signal within the reproduced signal is separated in the lowpass filter 23, and the separated frequency converted carrier chrominance signal is supplied to a carrier chrominance signal processing circuit 25 wherein the signal format of the frequency converted carrier chrominance signal is returned to the original signal format and frequency converted carrier chrominance signal is frequency-converted into a reproduced carrier chrominance signal in the original frequency band. The construction of the carrier chrominance signal processing circuit 25 itself is known in the VTR. The reproduced carrier chrominance signal is supplied to a de-emphasis circuit 26 which constitutes an essential part of the recording and reproducing apparatus according to the present invention. The de-emphasis circuit 26 has a vertical spatial frequency versus level characteristic complementary to the vertical spatial frequency versus level characteristic of the pre-emphasis circuit 15. In the de-emphasis circuit 26, the high-frequency component in the vertical spatial frequency of the reproduced carrier chrominance signal is relatively attenuated compared to the low-frequency component. Accordingly, the pre-emphasized reproduced carrier chrominance signal is de-emphasized into the carrier chrominance signal having the original signal waveform in the de-emphasis circuit 26, and is then supplied to a mixing circuit 27. The mixing circuit 27 mixes the reproduced luminance signal from the luminance signal processing circuit 24 and the reproduced carrier chrominance signal from the de-emphasis circuit 26, and a reproduced color video signal in which the noise component is reduced is obtained through an output terminal 28.

In the present embodiment, the de-emphasis circuit 26 relatively attenuates the high-frequency component in the vertical spatial frequency of the reproduced carrier chrominance signal compared to the low-frequency component. Thus, the signal-to-noise (S/N) ratio of the reproduced carrier chrominance signal can be improved. Although the de-emphasis circuit 26 relatively attenuates the high-frequency component in the vertical spatial frequency of the reproduced carrier chrominance signal compared to the low-frequency component, the pre-emphasis circuit 15 relatively emphasizes the high-frequency component in the vertical spatial frequency of the carrier chrominance signal compared to the low-frequency component at the time of the recording. For this reason, the vertical spatial frequency versus level characteristic of the carrier chrominance signal will not be deteriorated by the de-emphasis performed in the de-emphasis circuit 26. Therefore, it is possible to obtain through the output terminal 28 a reproduced color video signal in which the S/N ratio is improved and the vertical spatial frequency versus level characteristic of the carrier chrominance signal is not deteriorated.

Next, description will be given with respect to embodiments of the pre-emphasis circuit 15 and the de-emphasis circuit 26.

Figure 2:
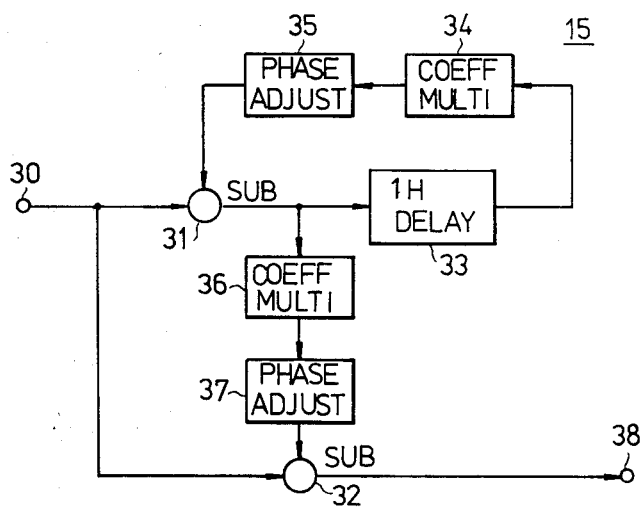
FIG. 2 is a systematic block diagram showing a first embodiment of a pre-emphasis circuit in the block system shown in FIG. 1.

FIG. 2 shows a first embodiment of the pre-emphasis circuit 15. In FIG. 2, a carrier chrominance signal which is separated from an NTSC system color video signal, for example, is applied to an input terminal 30. This carrier chrominance signal is supplied to subtracting circuits 31 and 32. An output carrier chrominance signal of the subtracting circuit 31 is supplied to a 1H delay circuit 33 wherein the carrier chrominance signal is delayed by one horizontal scanning period (1H). A delayed carrier chrominance signal from the 1H delay circuit 33 is supplied to a coefficient multiplier 34 which multiplies a coefficient (0.76, for example), and an output signal of the coefficient multiplier 34 is supplied to a phase adjuster 35. The phase adjuster 35 may be omitted if it is possible to accurately obtain a delay time of 1H in the 1H delay circuit 33. However, in reality, the delay time obtained in the 1H delay circuit 33 is not exactly equal to 1H. In the case where the delay time obtained in the 1H delay circuit 33 is not exactly equal to 1H and the output signal of the coefficient multiplier 34 is directly supplied to the subtracting circuit 31 wherein the signal is subjected to a subtraction with the carrier chrominance signal from the input terminal 30, the circuit will equivalently operate so as to reduce the multiplying coefficient of the coefficient multiplier 34. In this case, it is impossible to obtain a desired pre-emphasis characteristic.

Accordingly, the output signal of the coefficient multiplier 34 is passed through the phase adjuster 35, so as to match the phase of the output signal of the coefficient multiplier 34 with the phase of a carrier chrominance signal which is accurately delayed by 1H. In this case, it is possible to obtain the desired pre-emphasis characteristic.

The subtracting circuit 31 subtracts the output signal of the phase adjuster 35 from the carrier chrominance signal which is obtained through the input terminal 30. As is well known, the chrominance subcarrier frequency of the NTSC system carrier chrominance signal is 227.5 times the horizontal scanning frequency. Due the fraction of 0.5, the phase of the chrominance subcarrier at the beginning of 1H and the phase of the chrominance subcarrier at the end of 1H differ by 0.5 periods, that is, by 180°. Accordingly, the carrier chrominance signal which is accurately delayed by 1H and is obtained from the phase adjuster 35, has a phase opposite to the phase of the carrier chrominance signal from the input terminal 30, when a line correlation exists. When the line correlation exists, the carrier chrominance signal from the input terminal 30 is essentially added with the carrier chrominance signal of 1H before, and the added carrier chrominance signal is obtained from the subtracting circuit 31. The output carrier chrominance signal of the subtracting circuit 31 is supplied to the 1H delay circuit 33 and to a coefficient multiplier 36. The coefficient multiplier 36 multiplies a multiplying coefficient (0.14, for example) to the output carrier chrominance signal of the subtracting circuit 31, and an output signal of the coefficient multiplier 36 is supplied to the subtracting circuit 32 through a phase adjuster 37.

The subtracting circuit 32 subtracts an output carrier chrominance signal of the phase adjuster 37 from the carrier chrominance signal obtained through the input terminal 30. An output carrier chrominance signal of the subtracting circuit 32 is produced through an output terminal 38 as a pre-emphasized carrier chrominance signal. The phase adjuster 37 accurately adjusts the phase of the output carrier chrominance signal of the coefficient multiplier 36 with respect to the carrier chrominance signal obtained through the input terminal 30. The high-frequency component in the vertical spatial frequency of the carrier chrominance signal which is produced through the output terminal 38, is relatively emphasized compared to the low-frequency component. The pre-emphasized signal produced through the output terminal 38, is produced as the output signal of the pre-emphasis circuit 15.

Figure 3:
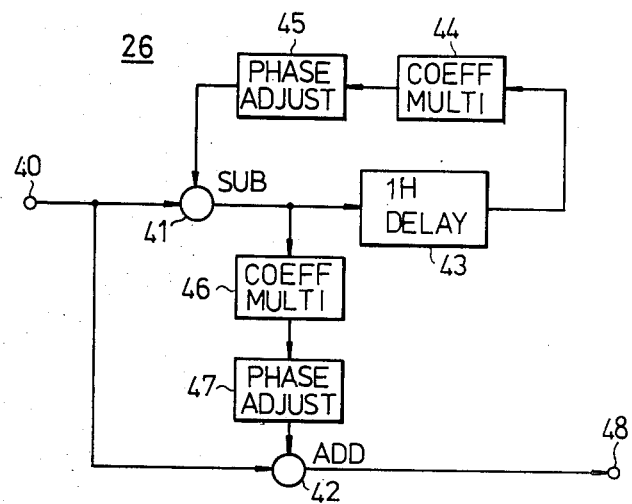
FIG. 3 is a systematic block diagram showing a first embodiment of a de-emphasis circuit in the block system shown in FIG. 1.

Next, description will be given with respect to a first embodiment of the de-emphasis circuit 26, by referring to FIG. 3. In FIG. 3, a reproduced carrier chrominance signal which is returned to the original frequency band, is applied to an input terminal 40. This reproduced carrier chrominance signal is supplied to a subtracting circuit 41 and to an adder 42. An output signal of the subtracting circuit 41 is fed back to the subtracting circuit 41 through a 1H delay circuit 43, a coefficient multiplier 44, and a phase adjuster 45. On the other hand, the output signal of the subtracting circuit 41 is also supplied to the adder 42, through a coefficient multiplier 46 and a phase adjuster 47. The phase adjuster 45 performs a phase adjustment so as to accurately obtain a delay of 1H, as in the case of the phase adjuster 35 described before. For example, multiplying coefficients of the coefficient multipliers 44 and 46 are respectively equal to 0.87 and 0.18.

The adder 42 adds the reproduced carrier chrominance signal from the input terminal 40 and the output reproduced carrier chrominance signal of the phase adjuster 47, and produces the added carrier chrominance signal through an output terminal 48 as a de-emphasized reproduced carrier chrominance signal. The high-frequency component in the vertical spatial frequency of the carrier chrominance signal which is produced through the output terminal 48, is relatively attenuated compared to the low-frequency component. The de-emphasis characteristic of the de-emphasis circuit 26 is complementary to the pre-emphasis characteristic of the pre-emphasis circuit 15, so that the high-frequency component in the vertical spatial frequency of the reproduced carrier chrominance signal is attenuated to an extent in correspondence with the extent to which the high-frequency component in the vertical spatial frequency of the carrier chrominance signal is emphasized at the time of the recording.

Figure 24:
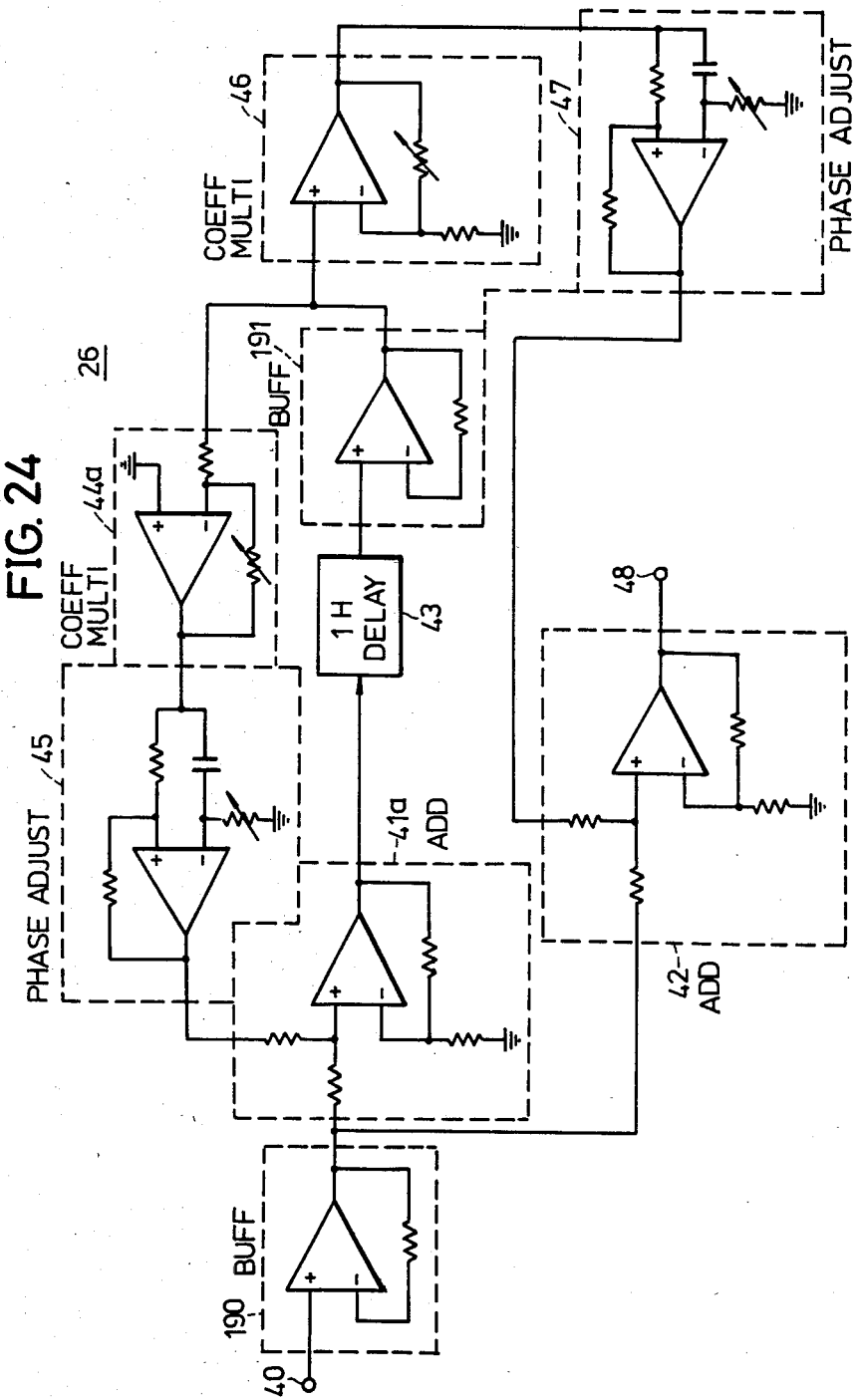
FIG. 24 is a concrete circuit diagram showing an embodiment of the de-emphasis circuit shown in FIG. 3.

A concrete circuit construction of the de-emphasis circuit 26 shown in FIG. 3, is shown in FIG. 24. In FIG. 24, those parts which are the same as those corresponding parts in FIG. 3 are designated by the same reference numerals, and their description will be omitted. The input terminal 40 is coupled to an adder 41a through a buffer amplifier 190. An output terminal of the 1H delay circuit 43 is coupled to the coefficient multiplier 46 through a buffer amplifier 191, and to a coefficient multiplier 44a. The coefficient multiplier 44a multiplies a negative multiplying coefficient which has the same absolute value as the multiplying coefficient of the coefficient multiplier 44. An output signal of the coefficient multiplier 44a is supplied to the adder 41a through the phase adjuster 45.

The adder 41a adds the reproduced carrier chrominance signal from the input terminal 40 and the output carrier chrominance signal of the phase adjuster 45 multiplied by the negative multiplying coefficient.

Hence, the operation of the adder 41a is essentially the same as the operation of the subtracting circuit 41 shown in FIG. 3.

Figure 4:
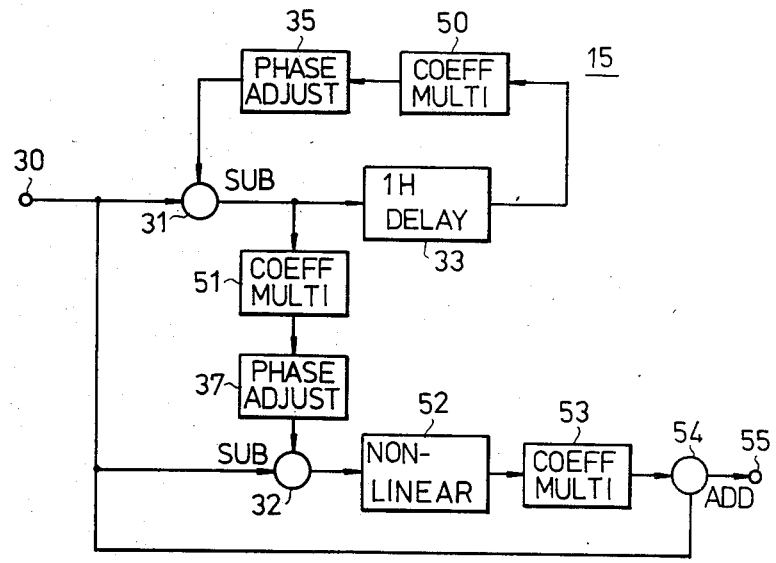
FIG. 4 is a systematic block diagram showing a second embodiment of the pre-emphasis circuit in the block system shown in FIG. 1.

Next, description will be given with respect to a second embodiment of the pre-emphasis circuit 15, by referring to FIG. 4. In FIG. 4, those parts which are the same as those corresponding parts in FIG. 2 are designated by the same reference numerals, and their description will be omitted. In FIG. 4, a coefficient multiplier 50 corresponds to the coefficient multiplier 34 shown in FIG. 2. The coefficient multiplier 50 multiplies a multiplying coefficient of approximately 0.76, for example. Similarly, a coefficient multiplier 51 corresponds to the coefficient multiplier 36 shown in FIG. 2, and multiplies a multiplying coefficient of approximately 0.24, for example.

The carrier chrominance signal from the subtracting circuit 32 is supplied to a non-linear circuit 52. The non-linear circuit 52 is an amplitude limiter, for example, for limiting the amplitude of an input signal to a predetermined value. The non-linear circuit 52 is designed to pass the input signal having an amplitude smaller than the predetermined value, without subjecting this input signal to an amplitude limitation.

Figure 7:
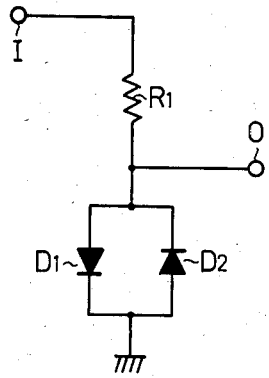
FIG. 7 is a circuit diagram showing an example of a non-linear circuit in the block systems shown in FIGS. 4 through 6.

FIG. 7 is a circuit diagram showing an example of the non-linear circuit 52. In FIG. 7, an input terminal I is coupled to an anode of a diode $D_1$ and to a cathode of a diode $D_2$, through a resistor $R_1$. A cathode of the diode $D_1$ and an anode of the diode $D_2$ are respectively grounded. A common connection point of the resistor $R_1$ and the diodes $D_1$ and $D_2$, is coupled to an output terminal O. The circuit construction of the circuit itself shown in FIG. 7 is known.

Figure 8:
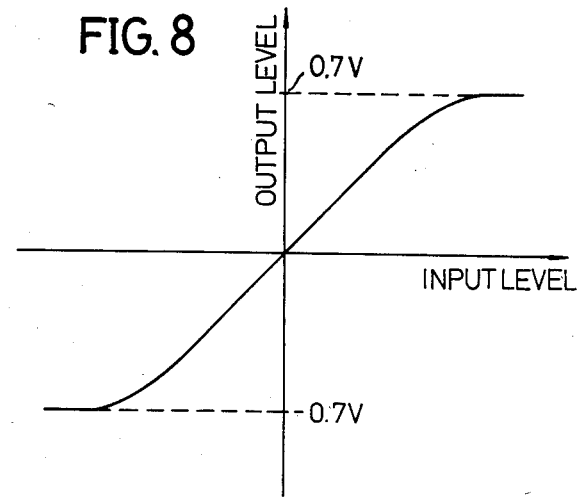
FIG. 8 is a graph showing an input versus output characteristic of the circuit shown in FIG. 7.

The diode $D_1$ is turned ON when an input voltage to the input terminal I becomes greater than 0.7 volts which is the forward drop voltage of the diode $D_1$. Hence, the input voltage greater than or equal to 0.7 volts, is amplitude limited to 0.7 volts and produced through the output terminal O. On the other hand, the diode $D_2$ is turned ON when the input voltage is less than 0.7 volts which is the forward drop voltage of the diode $D_2$. Thus, the input voltage less than or equal to $-0.7$ volts, is amplitude limited to $-0.7$ volts and produced through the output terminal O. In a case where the amplitude of the input voltage is between $+0.7$ volts and $-0.7$ volts, the diodes $D_1$ and $D_2$ remain OFF, and the input voltage is produced through the output terminal O without being subjected to the amplitude limitation. Accordingly, the input versus output characteristic of the non-linear circuit 52 having the circuit construction shown in FIG. 7, becomes as shown in FIG. 8.

The output carrier chrominance signal of the non-linear circuit 52, is supplied to a coefficient multiplier 53 wherein a multiplying coefficient of approximately 1.3, for example, is multiplied. An output signal of the coefficient multiplier 53 is supplied to an adder 54 and added with the carrier chrominance signal from the input terminal 30. An output signal of the adder 54 is produced through an output terminal 55, as a carrier chrominance signal which is subjected to a non-linear pre-emphasis which is dependent on the level of the carrier chrominance signal.

Figure 5:
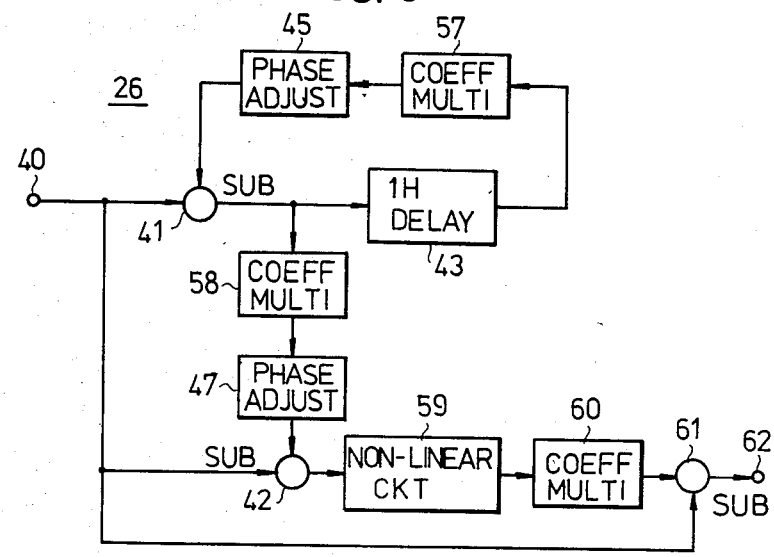
FIG. 5 is a systematic block diagram showing a second embodiment of the de-emphasis circuit in the block system shown in FIG. 1.

FIG. 5 shows a second embodiment of the de-emphasis circuit 26 shown in FIG. 1. In FIG. 5, those parts which are the same as those corresponding parts in FIG. 3 are designated by the same reference numerals, and their description will be omitted. In FIG. 5, coefficient multipliers 57 and 58 respectively correspond to the coefficient multipliers 44 and 46 shown in FIG. 3. Multiplying coefficients of the coefficient multipliers 57 and 58 are respectively equal to 0.87 and 0.13, for example. The reproduced carrier chrominance signal from the subtracting circuit 42 is supplied to a coefficient multiplier 60, through a non-linear circuit 59 which has the same circuit construction as the non-linear circuit 52. A multiplying coefficient of 0.57, for example, is multiplied to the reproduced carrier chrominance signal from the non-linear circuit 59, and an output carrier chrominance signal of the coefficient multiplier 60 is supplied to a subtracting circuit 61. The subtracting circuit 61 subtracts the output carrier chrominance signal of the coefficient multiplier 60 from the reproduced carrier chrominance signal which is obtained through the input terminal 40. A reproduced carrier chrominance signal which is subjected to a non-linear de-emphasis complementary to the non-linear pre-emphasis described before, is produced through an output terminal 62.

Figure 6:
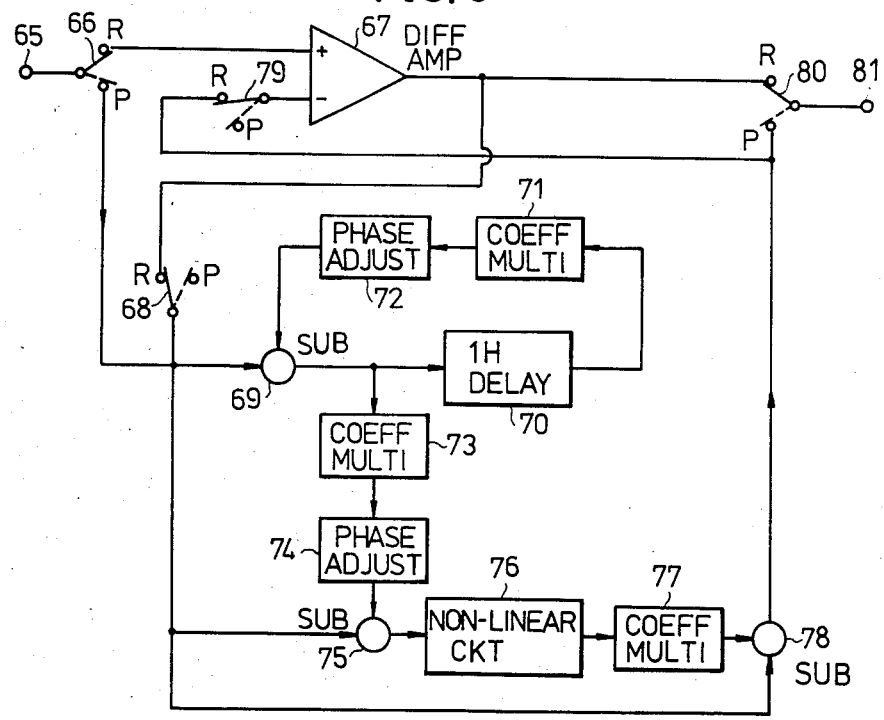
FIG. 6 is a systematic block diagram showing an embodiment in which a circuit is commonly used as the pre-emphasis circuit and the de-emphasis circuit.

FIG. 6 shows a circuit which is commonly used as the pre-emphasis circuit 15 and the de-emphasis circuit 26. At the time of the reproduction, switches 66, 68, 79, and 80 are connected to respective terminals P. Hence, the reproduced carrier chrominance signal applied to an input terminal 65, is supplied to a subtracting circuit 69, through the switch 66. An output signal of the subtracting circuit 69 is fed back to the subtracting circuit 69, through a 1H delay circuit 70, a coefficient multiplier 71, and a phase adjuster 72. The subtracting circuit 69 subtracts the output carrier chrominance signal of the phase adjuster 72, from the reproduced carrier chrominance signal of 1H after obtained through the switch 66. The output signal of the subtracting circuit 69 is also supplied to a subtracting circuit 75, through a coefficient multiplier 73 and a phase adjuster 74. The subtracting circuit 75 subtracts the output carrier chrominance signal of the phase adjuster 74, from the reproduced carrier chrominance signal obtained through the switch 66. An output signal of the subtracting circuit 75 is supplied to a subtracting circuit 78, through a non-linear circuit 76 and a coefficient multiplier 77. The subtracting circuit 78 subtracts the output carrier chrominance signal of the coefficient multiplier 77, from the reproduced carrier chrominance signal obtained through the switch 66. Accordingly, as in the case of the output signal of the subtracting circuit 61 shown in FIG. 5, a reproduced carrier chrominance signal which is subjected to the non-linear de-emphasis is obtained from the subtracting circuit 78. The de-emphasized carrier chrominance signal from the subtracting circuit 78 is passed through the switch 80 and is produced through an output terminal 81. According to the present embodiment shown in FIG. 6, the chances of the carrier chrominance signal not being restored to the original signal waveform is low, due to the provision of the non-linear circuit 76. For example, there is a deviation of only 1/G when it is assumed that the gain of a differential amplifier 67 is G.

On the other hand, at the time of the recording, the switches 66, 68, 79, and 80 are connected to respective terminals R. Thus, the carrier chrominance signal from the input terminal 65, is supplied to the subtracting circuit 69, through the switch 66 and the differential amplifier 67. The output signal of the subtracting circuit 69 is fed back to the subtracting circuit 69, through the 1H delay circuit 70, the coefficient multiplier 71, and the phase adjuster 72. The output carrier chrominance signal of the subtracting circuit 69 is also supplied to the subtracting circuit 75, through the coefficient multiplier 73 and the phase adjuster 74. The subtracting circuit 75 subtracts the output carrier chrominance signal of the phase adjuster 74 from the carrier chrominance signal which is obtained through the switch 68. The output signal of the subtracting circuit 75 is supplied to the non-linear circuit 76.

The non-linear circuit 76 has the same circuit construction as the non-linear circuits 52 and 59. The non-linear circuit 76 limits the large amplitude part of the output carrier chrominance signal of the subtracting circuit 75 to the predetermined amplitude, and supplies the amplitude limited carrier chrominance signal to the subtracting circuit 78 through the coefficient multiplier 77. The subtracting circuit 78 subtracts the output carrier chrominance signal of the coefficient multiplier 77 from the carrier chrominance signal which is obtained through the switch 68. Therefore, at the time of the recording, the de-emphasis circuit which is used at the time of the reproduction is inserted in a feedback path of the differential amplifier 67, and the circuit shown in FIG. 6 at the time of the recording has a pre-emphasis characteristic complementary to a de-emphasis characteristic of the circuit shown in FIG. 6 at the time of the reproduction. Accordingly, the output carrier chrominance signal of the differential amplifier 67, which is passed through the switch 80 and is produced through the output terminal 81, is subjected to the same non-linear pre-emphasis as in the case of the output carrier chrominance signal which is obtained through the output terminal 55 of the pre-emphasis circuit shown in FIG. 4. For example, multiplying coefficients of the coefficient multipliers 71, 73, and 77, are respectively equal to 0.87, 0.13, and 0.57.

In the embodiment shown in FIG. 6, the pre-emphasis characteristic is obtained by inserting the de-emphasis circuit shown in FIG. 5 into the feedback loop of the differential amplifier 67. However, the pre-emphasis characteristic may be obtained by inserting the de-emphasis circuit shown in FIG. 4 into the feedback loop of the differential amplifier 67. In addition, the circuit part constituted by the subtracting circuit 75, the non-linear circuit 76, the coefficient multiplier 77, and the subtracting circuit 78, may be omitted, and the output terminal of the phase adjuster 74 may be coupled to the terminal R of the switch 79 and to the terminal P of the switch 80. In this case, the circuit is commonly use as the linear pre-emphasis circuit shown in FIG. 1 and the linear de-emphasis circuit shown in FIG. 3.

The embodiments shown in FIGS. 2, 3, 4, 5, and 6, are forward type (recursive type) pre-emphasis or de-emphasis circuits. According to the forward type pre-emphasis or de-emphasis circuit, input information related to the past with respect to an output point are respectively weighted, and the weighted input information are added so as to obtain an input signal. On the other hand, output information at the output point is also weighted. Then, the input signal and the weighted output information are added or subtracted.

Figure 9:
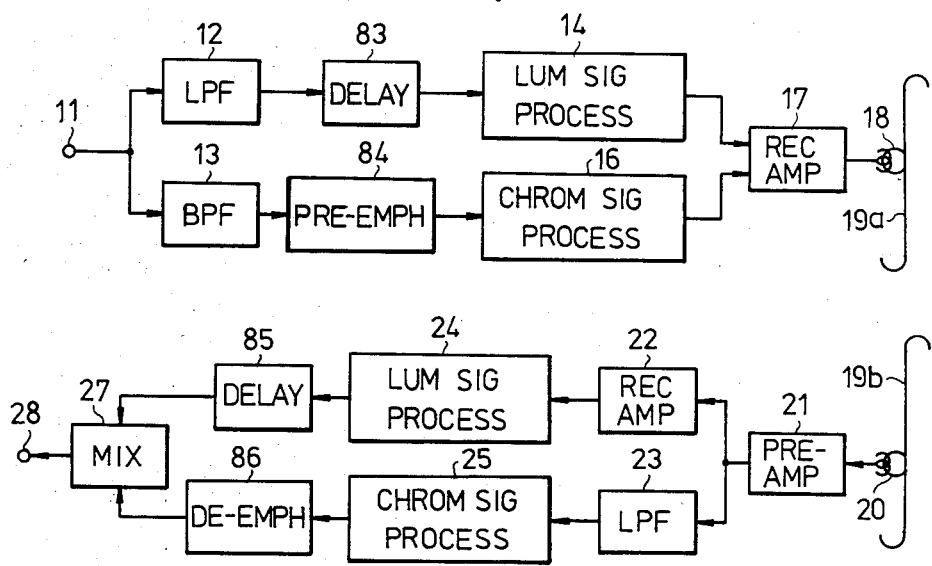
FIG. 9 is a systematic block diagram showing a second embodiment of the recording and reproducing apparatus according to the present invention.

Description will now be given with respect to a second embodiment of a recording and reproducing apparatus according to the present invention, by referring to FIG. 9. According to this second embodiment, the pre-emphasis circuit and the de-emphasis circuit are each made up of a backward type circuit alone, or made up of a transversal type filter which is a combination of backward type and forward type circuits. In FIG. 9, those parts which are the same as those corresponding parts in FIG. 1 are designated by the same reference numerals, and their description will be omitted. A delay circuit 83 delays the luminance signal by a time delay corresponding to the time delay in a pre-emphasis circuit 84, so as to match the timing of the luminance signal with the pre-emphasized carrier chrominance signal. A delay circuit 85 delays the reproduced luminance signal by a delay time corresponding to the time delay in a de-emphasis circuit 86, so as to match the timing of the reproduced luminance signal with the de-emphasized reproduced carrier chrominance signal.

The pre-emphasis circuit 84 is made up of a backward type pre-emphasis circuit alone or is made up of a combination of backward type and forward type pre-emphasis circuits, and relatively emphasizes the high-frequency component in the vertical spatial frequency of the carrier chrominance signal compared to the low-frequency component. On the other hand, the de-emphasis circuit 86 is made up of a backward type de-emphasis circuit along or is made up of a combination of backward type and forward type de-emphasis circuits, and relatively attenuates the high-frequency component in the vertical spatial frequency of the reproduced carrier chrominance signal compared to the low-frequency component. The de-emphasis circuit 86 has a vertical spatial frequency versus level characteristic complementary to the vertical spatial frequency versus level characteristic of the pre-emphasis circuit 84.

Next, description will be given with respect to embodiments of the pre-emphasis circuit 84 and the de-emphasis circuit 86. In the embodiments which will be described hereinafter, the construction of the de-emphasis circuit 86 is essentially the same as the construction of the pre-emphasis circuit 84. Thus, for convenience' sake, only the pre-emphasis circuit 84 will be illustrated, and the illustration of the corresponding de-emphasis circuit 86 will be omitted.

FIG. 10 shows a first embodiment of the pre-emphasis circuit 84. In FIG. 10, the carrier chrominance signal which is to be recorded, is applied to an input terminal 90. The carrier chrominance signal is successively delayed by 1H, for example, in n delay circuits $91_1$ through $91_n$ which are coupled in series, where n is a natural number greater than or equal to two. In this embodiment, n is greater than or equal to six. The carrier chrominance signal from the input terminal 90, is also supplied to a coefficient multiplier $92_1$ having a multiplying coefficient $(-1)^{n+1}k_n$. The delayed output signals of the delay circuits $91_1$ through $91_n$ are independently supplied to respective coefficient multipliers $92_2$ through $92_{n+1}$ wherein a multiplying coefficient is multiplied (that is, weighted). The coefficient multipliers $92_2, 92_3, \ldots, 92_{n-1}, 92_n,$ and $92_{n+1}$ respectively have multiplying coefficients $(-1)^n k_{n-1}, (-1)^{n-1} k_{n-2}, \ldots, -k_2, k_1,$ and $k_0$. As described before, the phase of the NTSC system carrier chrominance signal reverses for every 1H. When it is assumed that the delayed carrier chrominance signal obtained from the coefficient multiplier $92_{n+1}$ located at the last stage is a main signal, the multiplying coefficients of the coefficient multipliers $92_1$ through $92_n$ are selected so that the phases of the output delayed carrier chrominance signals of the coefficient multipliers $92_1$ through $92_n$ are all opposite with respect to the phase of the main signal. The coefficient multipliers $92_n, 92_{n-2}, \ldots$ each receive a delayed carrier chrominance signal which has a relative time delay difference of an odd number multiple of 1H with respect to the main signal, and have a positive multiplying coefficient. On the other hand, the coefficient multipliers $92_{n-1}$, $92_{n-3}$, ... each receive a delayed carrier chrominance signal which has a relative time delay difference of an even number multiple of 1H with respect to the main signal, and have a negative multiplying coefficient.

The output signals of the coefficient multipliers $92_1$ through $92_n$ are supplied to respective phase adjusters $93_1$ through $93_n$ wherein appropriate phase adjustments are performed with respect to the main signal. Output signals of the phase adjusters $93_1$ through $93_n$ are supplied to an adder 94 and added with the main signal from the coefficient multiplier $92_{n+1}$. Input information from the phase adjusters $93_1$ through $93_n$ related to the future with respect to the main signal, are weighted, and the weighted input information are added with the main signal from the coefficient multiplier $92_{n+1}$. The output carrier chrominance signal of the adder 94, is produced through an output terminal 95. The high-frequency component in the vertical spatial frequency of the carrier chrominance signal produced through the output terminal 95, is relatively emphasized compared to the low-frequency component.

FIG. 25 shows an embodiment of a concrete circuit construction of the pre-emphasis circuit 84 shown in FIG. 10. In FIG. 25, those parts which are the same as those corresponding parts in FIG. 10 are designated by the same reference numerals, and their description will be omitted. Resistors Ra within each of the phase adjusters $93_1$ through $93_n$ are selected to the same resistance. In addition, resistors Rb within the adder 94 are selected to the same resistance. The input terminal 90 is coupled to the delay circuit $91_1$ and to the coefficient multiplier $92_1$, through a buffer amplifier 195.

A de-emphasis circuit having a de-emphasis characteristic complementary to the pre-emphasis characteristic of the pre-emphasis circuit shown in FIG. 10, has a circuit construction which is essentially the same as the construction of the pre-emphasis circuit. For example, in the case of the de-emphasis circuit, multiplying coefficients of coefficient multipliers corresponding to the coefficient multipliers $92_1$ through $92_n$, are selected to predetermined positive or negative values having absolute values which are different from the multiplying coefficients of the corresponding coefficient multipliers $92_1$ through $92_n$. A multiplying coefficient of a coefficient multiplier corresponding to the coefficient multiplier $92_{n+1}$, is selected to a negative value. When it is assumed that a main signal is an output signal of a coefficient multiplier corresponding to the coefficient multiplier $92_{n+1}$, output signals of the coefficient multipliers corresponding to the coefficient multipliers $92_1$ through $92_n$ are in phase with the main signal.

A second embodiment of the pre-emphasis circuit shown in FIG. 11 is made up of a backward type pre-emphasis circuit alone, as in the case of the pre-emphasis circuit shown in FIG. 10. The pre-emphasis circuit shown in FIG. 10 is an output weighted type circuit, but the pre-emphasis circuit shown in FIG. 11 is an input weighted type circuit. In FIG. 11, the carrier chrominance signal applied to the input terminal 90, is supplied to a coefficient multiplier $97_1$ and multiplied by the positive multiplying coefficient $k_0$. An output signal of the coefficient multiplier $97_1$ is supplied to a delay circuit $99_1$ as a main signal. The carrier chrominance signal applied to the input terminal 90, is also supplied to n coefficient multipliers $97_2$ through $97_{n+1}$. The coefficient multipliers $97_2$ through $97_{n+1}$ respectively have multiplying coefficients $k_1, k_2, \ldots, (-1)^n k_{n-1}$, and $(-1)^{n+1} k_n$. Output signals of the coefficient multipliers $97_2$ through $97_{n+1}$ are supplied to respective phase adjusters $98_1$ through $98_n$, and outputs of the phase adjusters $98_1$ through $98_n$ are supplied to respective adders $100_1$ through $100_n$.

Delay circuits $99_1$ through $99_n$ each have a delay time of 1H. The output delayed carrier chrominance signal of the delay circuit $99_1$ is supplied to the adder $100_1$ and added with the output carrier chrominance signal of the phase adjuster $98_1$. Since the output carrier chrominance signal of the delay circuit $99_1$ is delayed by 1H with respect to the carrier chrominance signal applied to the input terminal 90, the phase of the output carrier chrominance signal of the delay circuit $99_1$ is opposite to the phase of the carrier chrominance signal applied to the input terminal 90. This means that the two carrier chrominance signals supplied to the adder $100_1$, have opposite phases when the line correlation exists. Hence, the adder $100_1$ essentially performs a subtracting operation. Output carrier chrominance signals of the adders $100_1, 100_2, \ldots,$ and $100_{n-1}$ are supplied to the respective delay circuits $99_2, 99_3, \ldots,$ and $99_n$. Output signals of the delay circuits $99_2, 99_3, \ldots,$ and $99_n$ are supplied to the respective adders $100_2, 100_3, \ldots,$ and $100_n$ and added with the undelayed carrier chrominance signals from the respective phase adjusters $98_2, 98_3, \ldots,$ and $98_n$. An output carrier chrominance signal of the adder $100_n$, which is produced through the output terminal 95, is subjected to the same pre-emphasis as in the case of the pre-emphasis circuits shown in FIGS. 2 and 10.

A de-emphasis circuit having a de-emphasis characteristic complementary to the pre-emphasis characteristic of the pre-emphasis circuit shown in FIG. 11, has a circuit construction which is essentially the same as the construction of the pre-emphasis circuit. For example, in the case of the de-emphasis circuit, a multiplying coefficient of a coefficient multiplier corresponding to the coefficient multiplier $97_1$ is selected to a negative value, when multiplying coefficients of coefficient multipliers corresponding to the coefficient multipliers $97_2$ through $97_{n+1}$ have the same polarity (but different values) as the multiplying coefficients of the coefficient multipliers $97_2$ through $97_{n+1}$.

Next, description will be given with respect to a third embodiment of the pre-emphasis circuit by referring to FIG. 12. In FIG. 12, those parts which are the same as those corresponding parts in FIG. 10 are designated by the same reference numerals, and their description will be omitted. In FIG. 12, however, the actual values of coefficients $(-1)^{n+1} k_n$ through $k_1$ and $k_0$ of the coefficient multipliers $92_1$ through $92_{n+1}$ and coefficient multipliers $102_1$ through $102_n$, are different from the values of the multiplying coefficients $(-1)^{n+1} k_n$ through $k_1$ and $k_0$ of the coefficient multipliers $92_1$ through $92_{n+1}$ shown in FIG. 10. This third embodiment is a combination of backward type and forward type pre-emphasis circuits, and is an output weighted type non-recursive pre-emphasis circuit. Delay circuits $101_1$ through $101_n$, the coefficient multipliers $102_1$ through $102_n$, phase adjusters $103_1$ through $103_n$, and an adder 104, constitute a forward type pre-emphasis circuit.

The output carrier chrominance signal of the delay circuit $91_n$ is successively delayed by a delay time of 1H, for example, in n delay circuits $101_1$ through $101_n$ which are coupled in series. Output delayed carrier chrominance signals of the delay circuits $101_1$ through $101_n$ are passed through the respective coefficient multipliers $102_1$ through $102_n$ and the respective phase adjusters $103_1$ through $103_n$. Output carrier chrominance signals of the phase adjusters $103_1$ through $103_n$ are supplied to the adder 104 and added with the output carrier chrominance signals of the phase adjusters $93_1$ through $93_n$. When it is assumed that an output carrier chrominance signal of a coefficient multiplier $102_n$ is a main signal, the output delayed carrier chrominance signals of the coefficient multipliers $102_1$ through $102_n$ are related to the past with respect to the main signal. The multiplying coefficients of the coefficient multipliers $102_1$ through $102_n$ are selected appropriate positive and negative values so that the output delayed carrier chrominance signals of the coefficient multipliers $102_1$ through $102_n$ are in phase with the main signal.

A carrier chrominance signal from the adder 104, which is produced through the output terminal 95, is subjected to the same pre-emphasis as in the case of the pre-emphasis circuit 84 described before.

A de-emphasis circuit having a de-emphasis characteristic complementary to the pre-emphasis characteristic of the pre-emphasis circuit shown in FIG. 12, has a circuit construction which is basically the same as the construction of the pre-emphasis circuit. In the case of the de-emphasis circuit, a main signal which is produced from a coefficient multiplier corresponding to the coefficient multiplier $92_{n+1}$. Multiplying coefficients of coefficient multipliers corresponding to the coefficient multipliers $92_1$ through $92_n$ and the coefficient multipliers $102_1$ through $102_n$, are selected to appropriate positive and negative values having absolute values which are different from the multiplying coefficients of the corresponding coefficient multipliers $92_1$ through $92_n$ and the coefficient multipliers $102_1$ through $102_n$, so that output reproduced carrier chrominance signals of these coefficient multipliers are in phase with the main signal.

In the embodiments of the pre-emphasis circuit 84 described heretofore, the pre-emphasis circuit has a linear pre-emphasis characteristic. Next, description will be given with respect to embodiments of the pre-emphasis circuit 84 having a non-linear pre-emphasis characteristic. FIG. 13 shows a fourth embodiment of the pre-emphasis circuit 84. In FIG. 13, the carrier chrominance signal applied to an input terminal 106, is successively supplied to n delay circuits $107_1$ through $107_n$ which are coupled in series. On the other hand, the carrier chrominance signal from the input terminal 106 is supplied to an adder 110, through a coefficient multiplier $108_1$ and a phase adjuster $109_1$. The coefficient multiplier $108_1$ has a multiplying coefficient $(-1)^{n+1}m_n$. An output carrier chrominance signal of the delay circuit $107_n$ located at the last stage, which is delayed by a delay time of nH, is multiplied by a positive multiplying coefficient $M_0$ in a coefficient multiplier $108_{n+1}$. In addition, the output carrier chrominance signal of the delay circuit $107_n$ is supplied to a coefficient multiplier 113. When it is assumed that the output carrier chrominance signal of the coefficient multiplier $108_{n+1}$ is a main signal, multiplying coefficients $(-1)^{n+1}m_n$, $(-1)^n m_{n-1}$, ..., $-m_2$, and $m_1$ of coefficient multipliers $108_1$, $108_2$, ..., $108_{n-1}$, and $108_n$ are selected so that phases of output carrier chrominance signals of the coefficient multipliers $108_1$ through $108_n$ are essentially opposite to the phase of the main signal. Among the coefficient multipliers $108_1$ through $108_n$, those coefficient multipliers which receive a delayed carrier chrominance signal which has a relative time delay difference of an odd number multiple of 1H with respect to the main signal, have a positive multiplying coefficient. On the other hand, those coefficient multipliers which receive a delayed carrier chrominance signal which has a relative time delay difference of an even number multiple of 1H with respect to the main signal, have a negative multiplying coefficient. In addition, phase adjusters $109_1$ through $109_n$ perform phase adjustments so that the phases of output signals of the phase adjusters $109_1$ through $109_n$ are perfectly opposite to the phase of the main signal.

A carrier chrominance signal obtained from the adder 110, has a signal waveform as if the vertical spatial frequency component of the carrier chrominance signal is differentiated. This output carrier chrominance signal of the adder 110 is supplied to an adder 112, through a non-linear circuit 111 having the same construction as the non-linear circuit 52 described before. The carrier chrominance signal from the non-linear circuit 111 is added in the adder 112 with the output delayed carrier chrominance signal of the coefficient multiplier 113. The output delayed carrier chrominance signal of the coefficient multiplier 113 is delayed by the delay time of nH and is multiplied by a multiplying coefficient $M_1$. An output signal of the adder 112 is produced through an output terminal 114.

A carrier chrominance signal which is subjected to a non-linear pre-emphasis as in the case of the pre-emphasis circuit shown in FIG. 4, is obtained through the output terminal 114. This fourth embodiment is a backward type pre-emphasis circuit in which the main signal at an output point is added with weighted carrier chrominance signals which are obtained by weighting carrier chrominance signals related to the future with respect to the main signal. Further, this fourth embodiment is an output weighted type non-recursive pre-emphasis circuit.

A de-emphasis circuit having a de-emphasis characteristic complementary to the pre-emphasis characteristic of the pre-emphasis circuit shown in FIG. 13, has a circuit construction which is basically the same as the construction of the pre-emphasis circuit. In the case of the de-emphasis circuit, a main signal which is produced from a coefficient multiplier corresponding to the coefficient multiplier $108_{n+1}$. Multiplying coefficients of coefficient multipliers corresponding to the coefficient multipliers $108_1$ through $108_n$, are selected to appropriate positive and negative values having absolute values which are different from the multiplying coefficients of the corresponding coefficient multipliers $108_1$ through $108_n$, so that output reproduced carrier chrominance signals of these coefficient multipliers are in phase with the main signal.

Next, description will be given with respect to a fifth embodiment of the pre-emphasis circuit by referring to FIG. 14. In FIG. 14, those parts which are the same as those corresponding parts in FIG. 13 are designated by the same reference numerals, and their description will be omitted. The carrier chrominance signal applied to the input terminal 106, is passed through a coefficient multiplier $115_1$ having a positive multiplying coefficient An output carrier chrominance signal of the coefficient multiplier $115_1$ is supplied to a delay circuit $117_1$ as a main signal. The carrier chrominance signal from the input terminal 106 is also applied to coefficient multipliers $115_2$, $115_3$, ..., and $115_{n+1}$ respectively having multiplying coefficients $m_1$, $-m_2$, ..., and $(-1)^{n+1}m_n$. Output signals of the coefficient multipliers $115_2$, $115_3$, .

..., and $115_{n+1}$ are supplied to respective adders $118_1$, $118_2$, ..., and $118_n$, through respective phase adjusters $116_1$, $116_2$, ..., and $116_n$. Delay circuits $117_1$ through $117_n$ each have a delay time of 1H. Output signals of the delay circuits $117_1$ through $117_n$ are supplied to the respective adders $118_1$ through $118_n$.

A carrier chrominance signal obtained from the adder $118_n$, has a signal waveform as if the vertical spatial frequency component of the carrier chrominance signal is differentiated. This output carrier chrominance signal of the adder $118_n$ is supplied to an adder 120, through a non-linear circuit 119 having the same construction as the non-linear circuit 111 described before. The carrier chrominance signal which is delayed by nH in the delay circuit $107_n$ located at the last stage and is multiplied by a positive multiplying coefficient $M_1$ in a coefficient multiplier 121, is supplied to a phase adjuster 122. The adder 120 adds an output carrier chrominance signal of the phase adjuster 122 and the output carrier chrominance signal of the non-linear circuit 119. The adder 120 produces a carrier chrominance signal which is subjected to a non-linear pre-emphasis, through the output terminal 114. This fifth embodiment is an input weighted type circuit, and is a backward type pre-emphasis circuit.

A de-emphasis circuit having a de-emphasis characteristic complementary to the pre-emphasis characteristic of the pre-emphasis circuit shown in FIG. 14, has a circuit construction which is basically the same as the construction of the pre-emphasis circuit. In the case of the de-emphasis circuit, a main signal which is produced from a coefficient multiplier corresponding to the coefficient multiplier $115_1$. Multiplying coefficients of coefficient multipliers corresponding to the coefficient multipliers $115_2$ through $115_{n+1}$, are selected to appropriate values, so that the phase relationship between the main signal and the output reproduced carrier chrominance signals of these coefficient multipliers corresponding to the coefficient multipliers $115_2$ through $115_{n+1}$ is opposite to the phase relationship for the case of the pre-emphasis circuit. In FIG. 14 (and in FIG. 15 which will be described hereinafter), the delay circuits $107_1$ through $107_n$ may be replaced by a single delay circuit having a delay time of nH.

Next, description will be given with respect to a sixth embodiment of the pre-emphasis circuit, by referring to FIG. 15. In FIG. 15, those parts which are the same as those corresponding parts in FIG. 14 are designated by the same reference numerals, and their description will be omitted. This sixth embodiment is an input weighted type circuit, and is a backward type pre-emphasis circuit as in the case of the fifth embodiment shown in FIG. 14. However, a main signal is obtained at a location different from that of the fifth embodiment. In FIG. 15, the carrier chrominance signal which is delayed by nH and is obtained from the delay circuit $107_n$, is supplied to coefficient multipliers 121 and 124. The coefficient multiplier 124 multiplies a positive multiplying coefficient $M_0$ to the delayed carrier chrominance signal from the delay circuit $107_n$. An output signal of the coefficient multiplier 124 is supplied to an adder 123 as the main signal. The adder 123 adds the main signal and the output signal of the adder $118_n$, and produces a carrier chrominance signal having a signal waveform as if the vertical spatial frequency component of the carrier chrominance signal is differentiated. The output carrier chrominance signal of the adder 123 is supplied to the adder 120 through the non-linear circuit 119 having the same construction as the non-linear circuit 52.

A de-emphasis circuit having a de-emphasis characteristic complementary to the pre-emphasis characteristic of the pre-emphasis circuit shown in FIG. 15, has a circuit construction which is basically the same as the construction of the pre-emphasis circuit. In the case of the de-emphasis circuit, multiplying coefficients of coefficient multipliers corresponding to the coefficient multipliers $115_2$ through $115_{n+1}$, 124, and 121 are selected to predetermined values which are different from the multiplying coefficients of the coefficient multipliers $115_2$ through $115_{n+1}$, 124, and 121 in the pre-emphasis circuit.

Next, description will be given with respect to a seventh embodiment of the pre-emphasis circuit, by referring to FIG. 16. In FIG. 16, those parts which are the same as those corresponding parts in FIG. 13 are designated by the same reference numerals, and their description will be omitted. The actual values of multiplying coefficients $(-1)^{n+1}m_n$ through $m_1$ and $M_0$ of the coefficient multipliers $108_1$ through $108_{n+1}$ and coefficient multipliers $130_1$ through $130_n$ shown in FIG. 16, are different from the values of the multiplying coefficients $(-1)^{n+1}m_n$ through $m_1$ and $M_0$ of the coefficient multipliers $108_1$ through $108_{n+1}$ shown in FIG. 13. This seventh embodiment is an output weighted type circuit made up of a combination of forward type and backward type circuits, and is a non-recursive pre-emphasis circuit. For example, delay circuits $129_1$ through $129_n$ each having a delay time of 1H, the coefficient multipliers $130_1$ through $130_n$ which receive respective output carrier chrominance signals of the delay circuits $129_1$ through $129_n$, and phase adjusters $131_1$ through $131_n$, constitute a forward type pre-emphasis circuit together with an adder 132.

The adder 132 adds the main signal from the coefficient multiplier $108_{n+1}$, the output carrier chrominance signals of the phase adjusters $109_1$ through $109_n$ which are input information related to the future with respect to the main signal, and the output carrier chrominance signals of the phase adjusters $131_1$ through $131_n$ which are input information related to the past with respect to the main signal. As a result, the level of the high-frequency component in the vertical spatial frequency of the carrier chrominance signal is emphasized compared to the low-frequency component, and the adder 132 produces a carrier chrominance signal having a signal waveform as if the vertical spatial frequency component of the carrier chrominance signal is differentiated. Since the circuit of this seventh embodiment is a combination of forward type and backward type circuits, the signal waveform of the carrier chrominance signal appears as if the signal is differentiated at the edge of the carrier chrominance signal. The output carrier chrominance signal of the adder 132 is supplied to an adder 134, through a non-linear circuit 133 having the same construction as the non-linear circuit 111. The adder 134 adds the carrier chrominance signal which is multiplied by a multiplying coefficient $M_1$ and is obtained from a coefficient multiplier 135, and an output signal of the non-linear circuit 133. Therefore, a pre-emphasized carrier chrominance signal is produced through the output terminal 114.

A de-emphasis circuit having a de-emphasis characteristic complementary to the pre-emphasis characteristic of the pre-emphasis circuit shown in FIG. 16, has a circuit construction which is basically the same as the construction of the pre-emphasis circuit. In the case of the de-emphasis circuit, a multiplying coefficient of a coefficient multiplier corresponding to the coefficient multiplier $108_{n+1}$ is selected to a negative value when multiplying coefficients of coefficient multipliers corresponding to the coefficient multipliers $108_1$ through $108_n$, $130_1$ through $130_n$, and 135 are selected to predetermined values which have the same polarity as the multiplying coefficients of the coefficient multipliers $108_1$ through $108_n$, $130_1$ through $130_n$, and 135 in the pre-emphasis circuit.

Next, description will be given with respect to an eighth embodiment of the pre-emphasis circuit, by referring to FIG. 17. In FIG. 17, those parts which are the same as those corresponding parts in FIGS. 2 and 13 are designated by the same reference numerals, and their description will be omitted. This eighth embodiment is an output weighted type pre-emphasis circuit made up of a combination of forward type and backward type circuits. This eighth embodiment differs from the seventh embodiment shown in FIG. 16, in that this eighth embodiment uses a recursive pre-emphasis circuit 137 having the construction shown in FIG. 2. According to this eighth embodiment, it is also possible to perform a non-linear pre-emphasis as in the case of the seventh embodiment shown in FIG. 16. Detailed description of this eighth embodiment will be omitted because the operation of the circuit shown in FIG. 17 can readily be understood from the description given heretofore.

In FIG. 17, the recursive pre-emphasis circuit 137 is coupled in a stage prior to a backward type pre-emphasis circuit 138, but the coupling may be reverse by coupling the backward type pre-emphasis circuit 138 in a stage prior to the recursive pre-emphasis circuit 137.

The following table shows the relationship of the type of circuit and the type of pre-emphasis and de-emphasis performed in each of the embodiments of the pre-emphasis circuit and the de-emphasis circuit, with respect to the figures.

TABLE

| Circuit type | | | Emphasis | | | |
|---|---|---|---|---|---|---|
| | | | Linear | | Non-linear | |
| Forward | Recursive | Forward addition | FIGS. 2 & 3 | | FIGS. 4 & 5 | |
| | | Feedback | | | FIG. 6 | |
| Backward | Non-recursive | | FIG. 10 | FIG. 11 | FIG. 13 | FIG. 14 |
| | | | | | | FIG. 15 |
| Forward & Backward | Non-recursive & recursive | | FIG. 12 | | FIG. 16 | |
| | | | | | FIG. 17 | |
| | | | Output weighted | Input weighted | Output weighted | Input weighted |
| | | | | Type | | |

In the table shown above, the spaces which are left blank correspond to pre-emphasis circuits and de-emphasis circuits which are also within the scope of the present invention, but the illustration of these circuits is omitted. For example, it is possible to design an output weighted type linear pre-emphasis circuit which is a combination of non-recursive and recursive circuits, by coupling the circuit shown in FIG. 2 in series with the circuit shown in FIG. 10. In addition, it is possible to design an input weighted type linear pre-emphasis circuit which is a combination of non-recursive and recursive circuits, by coupling the circuit shown in FIG. 2 in series with the circuit shown in FIG. 11.

Figure 26:
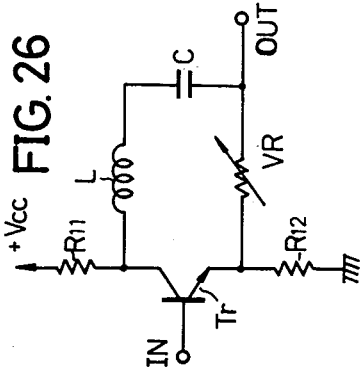
FIG. 26 is a concrete circuit diagram showing another embodiment of a phase adjuster within the pre-emphasis circuit or the de-emphasis circuit.

The present invention is not limited to the embodiments described heretofore. For example, the phase adjusters are coupled to the outputs of the coefficient multipliers in the embodiments which are described, however, the phase adjusters may be coupled to the inputs of the coefficient multipliers. In FIGS. 24 and 25, the phase adjusters each have an operational amplifier, but as shown in FIG. 26, it is possible to construct the phase adjuster from a bipolar transistor $T_r$, a collector resistor $R_{11}$, an emitter resistor $R_{12}$, a coil L, a capacitor C, and a variable resistor VR. Further, the delay times of the delay circuits $91_1$ through $91_n$, $99_1$ through $99_n$, $101_1$ through $101_n$, $107_1$ through $107_n$, $117_1$ through $117_n$, and $120_1$ through $120_n$ may be selected to an arbitrary natural number multiple of 1H. In this case, it is necessary to select the multiplying coefficients of the coefficient multipliers $92_1$ through $92_n$, $97_2$ through $97_{n+1}$, $102_1$ through $102_n$, $108_1$ through $108_n$, $115_2$ through $115_{n+1}$, and $130_1$ through $130_n$ to appropriate positive and negative values so that a predetermined phase relationship exists between the main signal and the output signals of these coefficient multipliers.

In the embodiments described heretofore, the NTSC system carrier chrominance signal is subjected to the pre-emphasis and the de-emphasis. However, it is of course possible to perform the pre-emphasis and the de-emphasis with respect to a PAL system carrier chrominance signal. In this case, it must be noted that between the two kinds of color difference signals of the PAL system carrier chrominance signal, the phase of the chrominance subcarrier of one color difference signal is reversed for every 1H. Hence, the delay times of the delay circuits 33, 43, 70, $91_1$ through $91_n$, $99_1$ through $99_n$, $101_1$ through $101_n$, $107_1$ through $107_n$, $117_1$ through $117_n$, and $129_1$ through $129_n$, should be selected to a natural number multiple of 2H. In addition, since the phase of the PAL system carrier chrominance signal is reversed by a delay of 2H or an odd number multiple of 2H, the number n in a multiplying coefficient of a coefficient multiplier indicates that the coefficient multiplier is located in a signal path having a time delay difference of 2nH with respect to the main signal.

The description given heretofore applies to the case where the input signal to the pre-emphasis circuit or the de-emphasis circuit is a carrier chrominance signal which is separated from a composite color video signal. Next, description will be given with respect to embodiments wherein the input signal to the pre-emphasis circuit or the de-emphasis circuit is a frequency converted carrier chrominance signal which is obtained by frequency-converting the carrier chrominance signal into a low frequency band.

Figure 18:
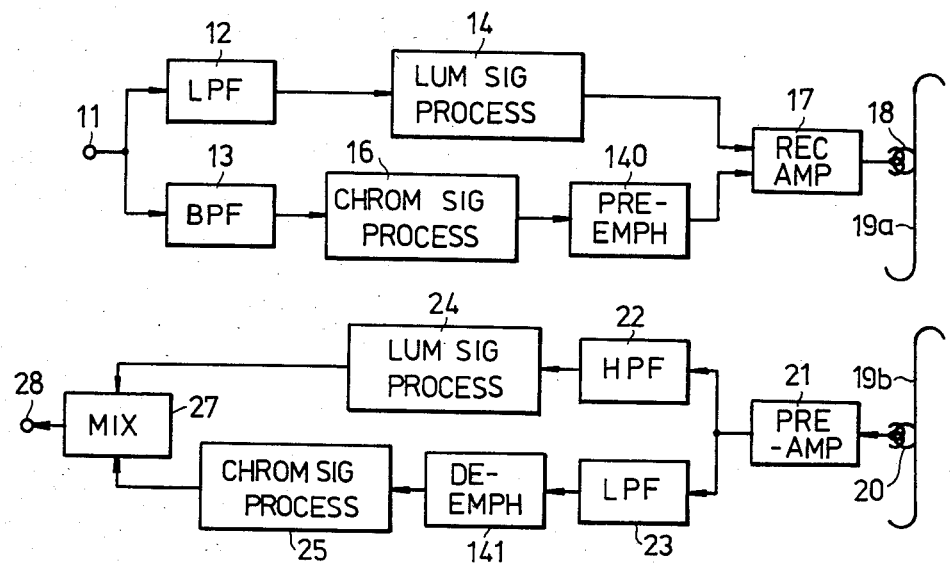
FIG. 18 is a systematic block diagram showing a third embodiment of the recording and reproducing apparatus according to the present invention.

FIG. 18 shows a third embodiment of the recording and reproducing apparatus according to the present invention. In FIG. 18, those parts which are the same as those corresponding parts in FIG. 1 are designated by the same reference numerals, and their description will be omitted. In FIG. 18, the frequency converted carrier chrominance signal which is obtained from the carrier chrominance signal processing circuit 16, is supplied to a pre-emphasis circuit 140. The pre-emphasis circuit 140 performs a pre-emphasis with respect to every signal component which appears in the vertical direction of the picture with an interval of one horizontal scanning period (1H). Thus, the frequency converted carrier chrominance signal is pre-emphasized so that a high-frequency component in the vertical spatial frequency of the frequency converted carrier chrominance signal is relatively emphasized compared to the low-frequency component. As will be described later on in the specification, the pre-emphasis circuit 140 may be a linear pre-emphasis circuit which performs the pre-emphasis with respect to the frequency converted carrier chrominance signal with a vertical spatial frequency versus level characteristic (pre-emphasis characteristic) which is independent of the level of the frequency converted carrier chrominance signal, or a non-linear pre-emphasis circuit which performs the pre-emphasis with respect to the frequency converted carrier chrominance signal with a vertical spatial frequency versus level characteristic (pre-emphasis characteristic) which is dependent on the level of the frequency converted carrier chrominance signal so as not to perform the pre-emphasis to a large extent with respect to the frequency converted carrier chrominance signal having a large level.

The frequency modulated luminance signal from the luminance signal processing circuit 14 and the pre-emphasized frequency converted carrier chrominance signal from the pre-emphasis circuit 140, are respectively supplied to the recording amplifier wherein the two signals are frequency-division-multiplexed and amplified. The output frequency-division-multiplexed signal of the recording amplifier 17 is recorded on the magnetic tape 19a by the recording rotary head 18.

On the other hand, at the time of the reproduction, the reproduced signal from the pre-amplifier 21 is supplied to the lowpass filter 23 wherein the reproduced frequency converted carrier chrominance signal is separated. The output reproduced frequency converted carrier chrominance signal of the lowpass filter 23 is supplied to a de-emphasis circuit 141. The de-emphasis circuit 141 has a vertical spatial frequency versus level characteristic complementary to the vertical spatial frequency versus level characteristic of the pre-emphasis circuit 140. In the de-emphasis circuit 141, the high-frequency component in the vertical spatial frequency of the reproduced frequency converted carrier chrominance signal is relatively attenuated compared to the low-frequency component. Accordingly, the pre-emphasized reproduced frequency converted carrier chrominance signal is de-emphasized in the de-emphasis circuit 141, into a reproduced frequency converted carrier chrominance signal having the original signal waveform of the output frequency converted carrier chrominance signal of the carrier chrominance signal processing circuit 16. The output reproduced frequency converted carrier chrominance signal of the de-emphasis circuit 141 is supplied to the chrominance signal processing circuit 25.

In this third embodiment of the invention, the de-emphasis circuit 141 relatively attenuates the high-frequency component in the vertical spatial frequency of the reproduced frequency converted carrier chrominance signal compared to the low-frequency component. Thus, the signal-to-noise (S/N) ratio of the reproduced carrier chrominance signal can be improved. Although the de-emphasis circuit 141 relatively attenuates the high-frequency component in the vertical spatial frequency of the reproduced frequency converted carrier chrominance signal compared to the low-frequency component, the pre-emphasis circuit 140 relatively emphasizes the high-frequency component in the vertical spatial frequency of the frequency converted carrier chrominance signal compared to the low-frequency component at the time of the recording. For this reason, the vertical spatial frequency versus level characteristic of the carrier chrominance signal will not be deteriorated by the de-emphasis performed in the de-emphasis circuit 141. Therefore, it is possible to obtain through the output terminal 28 a reproduced color video signal in which the S/N ratio is improved and the vertical spatial frequency versus level characteristic of the carrier chrominance signal is not deteriorated.

In a case where the pre-emphasis circuit 140 and the de-emphasis circuit 141 respectively have a non-linear pre-emphasis characteristic for performing the pre-emphasis with respect to the large level component of the frequency converted carrier chrominance signal only to a certain extent (essentially none) and a non-linear de-emphasis characteristic for performing the de-emphasis with respect to the large level component of the reproduced frequency converted carrier chrominance signal only to a certain extent (essentially none), the compatibility between the recording and reproducing apparatus according to the present invention and the existing VTR can be maintained. In other words, no problems will be introduced when a magnetic tape recorded by the existing VTR is played on the recording and reproducing apparatus according to the present invention, and no problems will be introduced when a magnetic tape recorded by the recording and reproducing apparatus according to the present invention is played on the existing VTR. Thus, it is possible to provide the non-linear de-emphasis circuit 141 only in the reproducing system, and the pre-emphasis circuit in the recording system may be omitted.

Further, when the frequency converted carrier chrominance signal and the frequency modulated luminance signal are frequency-division-multiplexed and recorded on the magnetic tape and the frequency-division-multiplexed signal is to be reproduced from this magnetic tape, the level of the reproduced frequency modulated luminance signal decreases and the S/N ratio of the reproduced frequency modulated luminance signal becomes poor when the frequency converted carrier chrominance signal having the large level due to the overshoot is simultaneously recorded together with the frequency modulated luminance signal. Such decrease in the level of the reproduced frequency modulated luminance signal and the deterioration in the S/N ratio of the reproduced frequency modulated luminance signal occur due to the well known magnetic recording and reproducing characteristics, even when the frequency modulated luminance signal is recorded on the magnetic tape at with optimum level. Moreover, a cross modulation occurs when the frequency-division-multiplexed signal is transmitted through the magnetic tape which is a non-linear transmitting system. When the level of the frequency converted carrier chrominance signal becomes greater than the level of the frequency modulated luminance signal by a predetermined rate, the cross modulation becomes conspicuous as moire.

However, according to the third embodiment of the invention, it is possible to reduce the overshoot quantity of the frequency converted carrier chrominance signal introduced due to the pre-emphasis. For this reason, the undesirable effects such as the deterioration in the S/N ratio of the reproduced luminance signal and moire can be reduced, and it is possible to improve the S/N ratio of the reproduced carrier chrominance signal.

In addition, according to this third embodiment of the invention, the pre-emphasis and the de-emphasis are performed with respect to the frequency converted carrier chrominance signal having a chrominance subcarrier frequency of 629 kHz, for example. Hence, the phase adjusters for adjusting the phases of input signals to the adder or subtracting circuit, which are required in the first and second embodiments of the invention in which the pre-emphasis and the de-emphasis are performed with respect to the carrier chrominance signal in the original band (the chrominance subcarrier frequency is equal to 3.58 MHz in the case of the NTSC system carrier chrominance signal in the original band), are unnecessary in the third embodiment of the invention. This is because the pre-emphasis circuit 140 and the de-emphasis circuit 141 each have a delay circuit, as will be described later on in the specification. In actual practice, there is an error in the delay times of delay circuits which are supposed to have the same delay time, and the actual delay time slightly differs for each delay circuit. However, the phase deviation which occur in the output signal of the delay circuit due to this error, is extremely small when the input signal is the frequency converted carrier chrominance signal having the chrominance subcarrier frequency of 625 kHz, for example, compared to the case where the input signal is the carrier chrominance signal having the chrominance subcarrier frequency of 3.58 MHz. In addition, compared to the case where the pre-emphasis and the de-emphasis are performed with respect to the carrier chrominance signal, the emphasis quantity can be set with a larger degree of freedom and the reproducibility of the original signal waveform can be improved when the pre-emphasis and the de-emphasis are performed with respect to the frequency converted carrier chrominance signal.

In a case where the pre-emphasis circuit 140 and the de-emphasis circuit 141 are constituted by backward type circuits, it is customary to provide a delay circuit at the input or output stage of each of the processing circuits 14 and 24 for the purpose of matching the timing of the luminance signal with the carrier chrominance signal.

Next, description will be given with respect to a fourth embodiment of the recording and reproducing apparatus according to the present invention, by referring to FIG. 19. In the third embodiment of the invention described before, the pre-emphasis circuit 140 and the de-emphasis circuit 141 are provided within the recording and reproducing apparatus (VTR), however, in this fourth embodiment of the invention, the pre-emphasis circuit 140 and the de-emphasis circuit 141 are provided within an adapter 142. In other words, an NTSC system color video signal applied to an input terminal 143, is supplied to a luminance and chrominance signal (YC) separating circuit 144 wherein the color video signal is separated into the luminance signal and the carrier chrominance signal. The separated carrier chrominance signal is supplied to a frequency converter 145. The carrier chrominance signal is frequency-converted into a low frequency band so that the chrominance subcarrier frequency becomes equal to 629 kHz, for example, and the frequency converted carrier chrominance signal is supplied to the pre-emphasis circuit 140. The pre-emphasis circuit 140 subjects the frequency converted carrier chrominance signal to the pre-emphasis described before, and the pre-emphasized frequency converted carrier chrominance signal is supplied to a frequency converter 146 wherein the signal is frequency-converted back into the original frequency band (that is, so that the chrominance subcarrier frequency becomes equal to 3.58 MHz).

The output carrier chrominance signal of the frequency converter 146 is supplied to a mixer 147 and is mixed with the separated luminance signal from the YC separating circuit 144. The mixed signal is applied to a recording video signal input terminal of a VTR 152 wherein the mixed signal is subjected to a known predetermined signal processing and is then recorded on a magnetic tape (not shown).

The reproduced signal which is reproduced from the magnetic tape by the VTR 152, is subjected to a predetermined signal processing and is converted into a reproduced color video signal which is in conformance with the standard system. The reproduced color video signal from the VTR 152 is supplied to a YC separating circuit 148 wherein the reproduced luminance signal and the reproduced carrier chrominance signal are separated. The reproduced carrier chrominance signal from the YC separating circuit 148 is supplied to a frequency converter 149 wherein the signal is frequency-converted into a low frequency band so that the chrominance subcarrier frequency becomes equal to 629 kHz. The output reproduced frequency converted carrier chrominance signal of the frequency converter 149 is supplied to the de-emphasis circuit 141 which performs the de-emphasis described before which is complementary to the pre-emphasis performed in the pre-emphasis circuit 140 at the time of the recording.

The output reproduced frequency converted carrier chrominance signal of the de-emphasis circuit 141 is supplied to a frequency converter 150 wherein the signal is frequency-converted back into the original frequency band. The output reproduced carrier chrominance signal of the frequency converter 150 is supplied to a mixer 151 and is mixed with the separated reproduced luminance signal from the YC separating circuit 148. The mixed signal from the mixer 151 is produced through an output terminal 153 as a reproduced color video signal which is in conformance with the standard system.

According to this fourth embodiment of the invention, it is possible to obtain the effects of the third embodiment of the invention described before, by connecting to the existing VTR the adapter 142 which is made up of the elements 140, 141, and 144 through 151.

Figure 19:
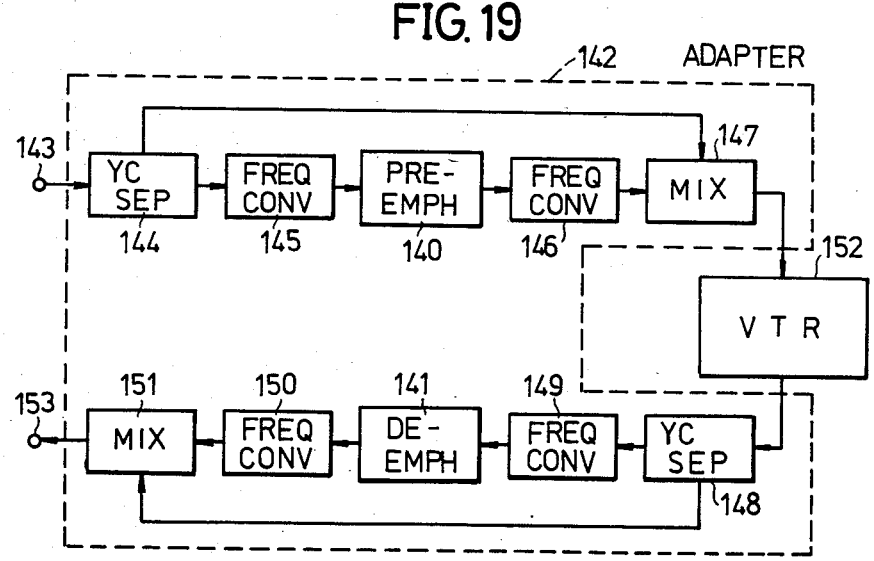
FIG. 19 is a systematic block diagram showing a fourth embodiment of the recording and reproducing apparatus according to the present invention.

In the fourth embodiment of the invention shown in FIG. 19 which is an adapter type apparatus, the delay times in the pre-emphasis circuit 140 and the de-emphasis circuit 141 are respectively selected to 1H for the NTSC system and 2H for the PAL system, regardless of whether the phase shift process with respect to the carrier chrominance signal is performed in the VTR 152.

Figure 20:
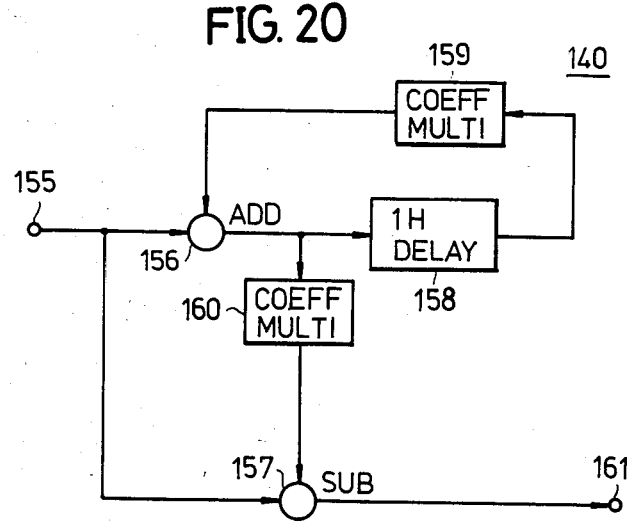
FIG. 20 is a systematic block diagram showing a first embodiment of a pre-emphasis circuit in the block system shown in FIG. 19.
Figure 27:
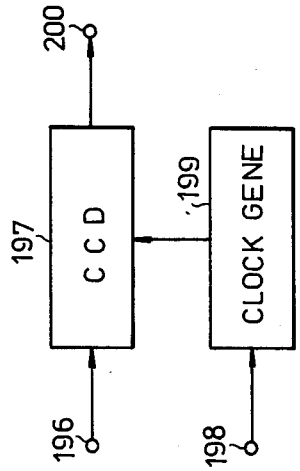
FIG. 27 is a systematic block diagram showing an embodiment of a delay circuit within the pre-emphasis circuit and the de-emphasis circuit in the block systems shown in FIGS. 18 and 19.

Next, description will be given with respect to embodiments of the pre-emphasis circuit 140 and the de-emphasis circuit 141. FIG. 20 shows a first embodiment of the pre-emphasis circuit 140. In FIG. 20, a frequency converted carrier chrominance signal is applied to an input terminal 155. This frequency converted carrier chrominance signal is obtained by separating the carrier chrominance signal from an NTSC system color video signal, for example, and frequency-converting the separated carrier chrominance signal into a low frequency band. The frequency converted carrier chrominance signal is supplied to an adder 156 and to a subtracting circuit 157. An output frequency converted carrier chrominance signal of the adder 156 is supplied to a 1H delay circuit 158 wherein the signal is delayed by 1H. Since the input signal to the 1H delay circuit 158 is the frequency converted carrier chrominance signal having a low frequency, it is impossible to employ an ultrasonic delay line having glass and the medium, and the 1H delay circuit 158 is constituted by a delay element of other types. For example, the 1H delay circuit 158 has a construction shown in FIG. 27. In FIG. 27, the frequency converted carrier chrominance signal is supplied to a charge coupled device (CCD) 197 through an input terminal 196. The CCD 197 is employed as an example of a charge transfer element for delaying the frequency converted carrier chrominance signal by 1H. A clock pulse generator 199 generates clock pulses in phase with a horizontal synchronizing signal which is supplied to the clock pulse generator 199 through an input terminal 198. The output clock pulses of the clock pulse generator 199 are supplied to the CCD 197, so as to variably control the delay time in the CCD 197. The frequency converted carrier chrominance signal which is delayed by 1H, is produced through an output terminal 200.

The delayed frequency converted carrier chrominance signal obtained from the 1H delay circuit 158, is multiplied by a multiplying coefficient (0.76, for example) in a coefficient multiplier 159. An output carrier chrominance signal of the coefficient multiplier 159 is supplied to the adder 156. In a case where the phase shift process described before is performed as a countermeasure against the crosstalk, the chrominance subcarrier frequency of the frequency converted carrier chrominance signal which is applied to the input terminal 155, is selected to an integral multiple of $f_H/2$ so as to visually reduce the noise which is generated due to the cross modulation with the frequency modulated luminance signal, where $f_H$ is the horizontal scanning frequency. For example, the chrominance subcarrier frequency of the frequency converted carrier chrominance signal is equal to 629 kHz when the chrominance subcarrier frequency is 80 times $f_H/2$. Accordingly, the chrominance subcarrier frequency of the frequency converted carrier chrominance signal is 40 time $f_H/2$ in this case, and the phase of the chrominance subcarrier match at the beginning and the end of 1H because the chrominance subcarrier frequency is exactly an integral multiple of $f_H/2$.

Therefore, when the line correlation exists between output frequency converted carrier chrominance signal of the coefficient multiplier 159 and the frequency converted carrier chrominance signal of 1H after obtained through the input terminal 155, the two signals are in phase. There is a time difference of 1H between the frequency converted carrier chrominance signals which are added in the adder 156, and the added output signal of the adder 156 is supplied to the 1H delay circuit 158 and to a coefficient multiplier 160. The coefficient multiplier 160 multiplies a multiplying coefficient (0.14, for example) to the added output signal of the adder 156, and an output signal of the coefficient multiplier 160 is supplied to the subtracting circuit 157.

The subtracting circuit 157 subtracts the output frequency converted carrier chrominance signal of the coefficient multiplier 160 from the frequency converted carrier chrominance signal which is received through the input terminal 155. An output signal of the subtracting circuit 157 is produced through an output terminal 161 as a pre-emphasized frequency converted carrier chrominance signal. In the pre-emphasized frequency converted carrier chrominance signal which is produced through the output terminal 161, the high-frequency component in the vertical spatial frequency of the frequency converted carrier chrominance signal applied to the input terminal 155 is relatively emphasized compared to the low-frequency component.

Figure 21:
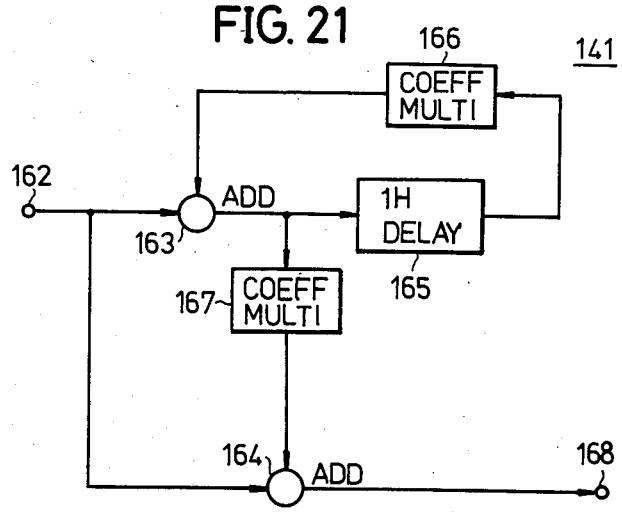
FIG. 21 is a systematic block diagram showing an embodiment of a de-emphasis circuit in the block system shown in FIG. 19.

Next, description will be given with respect to an embodiment of the de-emphasis circuit 141, by referring to FIG. 21. In FIG. 21, a reproduced frequency converted carrier chrominance signal is applied to an input terminal 162. This reproduced frequency converted carrier chrominance signal is supplied to adders 163 and 164. An output signal of the adder 163 is fed back to the adder 163, through a 1H delay circuit 165 and a coefficient multiplier 166. On the other hand, the output signal of the adder 163 is also supplied to the adder 164 through a coefficient multiplier 167. The coefficient multiplier 166 has a multiplying coefficient of 0.87, for example, and the coefficient multiplier 167 has a multiplying coefficient of 0.18, for example.

The adder 164 adds the reproduced frequency converted carrier chrominance signal from the input terminal 162 and the reproduced carrier chrominance signal from the coefficient multiplier 167, and produces the added signal through an output terminal 168. In this reproduced frequency converted carrier chrominance signal which is produced through the output terminal 168, the high-frequency component in the vertical spatial frequency of the reproduced frequency converted carrier chrominance signal applied to the input terminal 162 is relatively attenuated compared to the low-frequency component. The de-emphasis performed in the de-emphasis circuit 141 is complementary to the pre-emphasis performed in the pre-emphasis circuit 140.

The 1H delay circuit 165 has the same construction as the 1H delay circuit 158. As shown in FIG. 27, the 1H delay circuit 165 may be constituted by the CCD 197 and the clock pulse generator 199 which is made up of a phase locked loop (PLL). The clock pulse generator 199 generates clock pulses in phase with a reproduced horizontal synchronizing signal when the reproduced horizontal synchronizing signal is applied to the input terminal 198. The delay time of the CCD 197 is proportional to the period of the clock pulses. On the other hand, the reproduced signal includes a time base deviation (jitter) due to the instability of the magnetic tape movement or the like. Accordingly, the clock pulses which are generated from the clock pulse generator 199 in phase with the reproduced horizontal synchronizing signal which includes the time base deviation, also includes this time base deviation. As a result, the delay time of the CCD 197 is also varied responsive to the time base deviation. This means that the reproduced frequency converted carrier chrominance signal which includes the same time base deviation and is applied to the input terminal 162, and the delayed reproduced frequency converted carrier chrominance signal from the coefficient multiplier 166, are perfectly in phase when these signals are added in the adder 163. Therefore, the reproducibility of the original signal waveform and the S/N ratio of the reproduced signal are further improved.

Next, description will be given with respect to a second embodiment of the pre-emphasis circuit 140, by referring to FIG. 22. In FIG. 22, those parts which are the same as those corresponding parts in FIG. 20 are designated by the same reference numerals, and their description will be omitted. The multiplying coefficient of the coefficient multiplier 159 shown in FIG. 22 is approximately equal to 0.76, for example. A multiplying coefficient of a coefficient multiplier 170 corresponding to the coefficient multiplier 160, is approximately equal to 0.24, for example.

The frequency converted carrier chrominance signal from the subtracting circuit 157 is supplied to a non-linear circuit 171 which has the same construction as the non-linear circuit 52 described before. An output frequency converted carrier chrominance signal of the non-linear circuit 171 is supplied to a coefficient multiplier 172 wherein a multiplying coefficient of approximately 1.3, for example, is multiplied. An output frequency converted carrier chrominance signal of the coefficient multiplier 172 is supplied to an adder 173 and added with the frequency converted carrier chrominance signal from the input terminal 155. An output frequency converted carrier chrominance signal of the adder 173 is produced through an output terminal 174. The frequency converted carrier chrominance signal obtained through the output terminal 174 is subjected to the non-linear pre-emphasis described before.

In a recording and reproducing apparatus having the pre-emphasis circuit 140 shown in FIG. 22 in the recording system thereof, the de-emphasis circuit 141 having essentially the same construction as the pre-emphasis circuit 140 shown in FIG. 22 is provided in the reproducing system thereof. The construction of the de-emphasis circuit 141 is essentially the same as the construction of the pre-emphasis circuit 140 shown in FIG. 22, however, multiplying coefficients of coefficient multipliers corresponding to the coefficient multipliers 159, 170, and 172 are respectively selected to 0.87, 0.13, and 0.57, for example. In addition, a subtracting circuit is provided instead of the adder 173.

The construction of the pre-emphasis circuits 140 shown in FIGS. 20 and 22, are similar to the construction of the pre-emphasis circuits 15 shown in FIGS. 2 and 4. The construction of the de-emphasis circuit 141 shown in FIG. 21 is similar to the construction of the de-emphasis circuit 26 shown in FIG. 3. However, the phase adjusters 35, 37, 45, and 47 do not exist in the circuits shown in FIGS. 20, 21, and 22. Moreover, as described before, the construction of the 1H delay circuits 33 and 43 are different from the construction of the 1H delay circuits 158 and 165.

Figure 23:
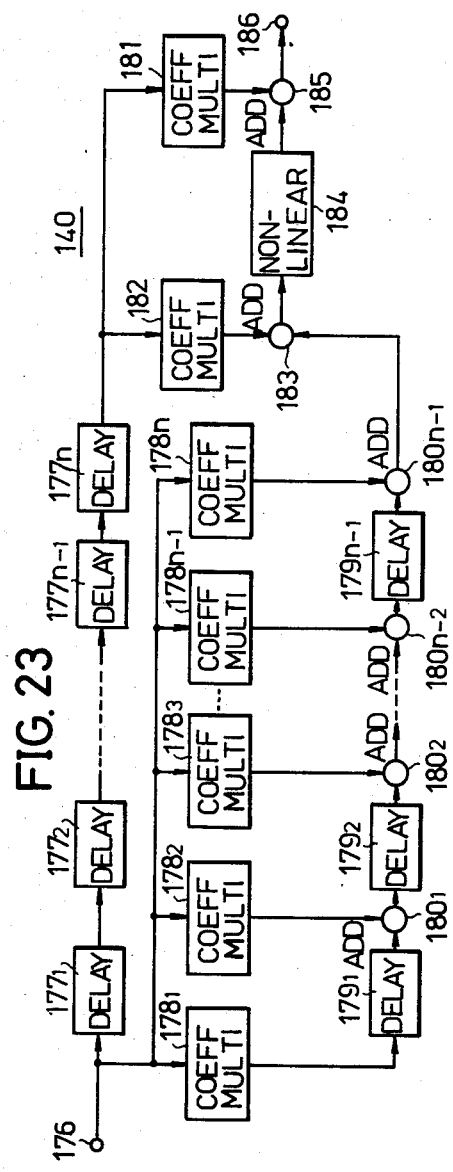
FIG. 23 is a systematic block diagram showing a third embodiment of the pre-emphasis circuit in the block system shown in FIG. 19.

Next, description will be given with respect to a third embodiment of the pre-emphasis circuit 140, by referring to FIG. 23. This third embodiment is an input weighted type circuit as in the case of the pre-emphasis circuit 84 shown in FIG. 15, and is a backward type pre-emphasis circuit. In FIG. 23, the frequency converted carrier chrominance signal applied to an input terminal 176, is successively delayed by n delay circuits $177_1$ through $177_n$ each having a delay time of 1H. An output delayed frequency converted carrier chrominance signal of the delay circuit $177_n$, which is delayed by nH, is supplied to a coefficient multipliers 181 and 182. The delayed frequency converted carrier chrominance signal is multiplied by a positive multiplying coefficient in the coefficient multiplier 182, and is then supplied to an adder 183 as a main signal.

On the other hand, the frequency converted carrier chrominance signal from the input terminal 176 is supplied to coefficient multipliers $178_1$ through $178_n$ wherein the signal is multiplied by respective multiplying coefficients $-m_1, -m_2, \ldots,$ and $-m_n$. Output signals of the coefficient multipliers $178_2$ through $178_n$ are supplied to respective adders $180_1$ through $180_{n-1}$. The adders $180_1$ through $180_{n-1}$ also receive output signals of delay circuits $179_1$ through $179_{n-1}$. A delay circuit $179_1$ receives the output signal of the coefficient multiplier $178_1$. The delay circuits $179_1$ through $179_{n-1}$ each have a delay time of 1H. The adder 183 adds the main signal from the coefficient multiplier 182 and an output signal of the adder $180_{n-1}$. An output signal of the adder 183 has a signal waveform as if the vertical spatial frequency component of the frequency converted carrier chrominance signal is differentiated. The output signal of the adder 183 is supplied to an adder 185 through a non-linear circuit 184. The adder 185 adds the output signal of the coefficient multiplier 181 and the output signal of the non-linear circuit 184, and produces the added signal through an output terminal 186.

A de-emphasis circuit for performing a de-emphasis complementary to the pre-emphasis performed in the pre-emphasis circuit 140 shown in FIG. 23, has essentially the same construction as the pre-emphasis circuit 140 shown in FIG. 23. However, multiplying coefficients of coefficient multipliers corresponding to the coefficient multipliers $178_1$ through $178_n$, 181, and 182, are selected to values which are different from the multiplying coefficients of the coefficient multipliers $178_1$ through $178_n$, 181, and 182.

As other embodiments of the pre-emphasis circuit 140, the pre-emphasis circuit 140 may be constructed similarly as in the case of the pre-emphasis circuits 84 shown in FIGS. 10 through 14, 16, and 17. However, in the case of the pre-emphasis circuit 140, it is unnecessary to provide the phase adjusters $93_1$ through $93_n$, $109_1$ through $109_n$, $116_1$ through $116_n$, and $131_1$ through $131_n$. In addition, multiplying coefficients of coefficient multipliers are selected to different polarities compared to the pre-emphasis circuit 84. The multiplying coefficients of the coefficient multipliers corresponding to the coefficient multipliers $92_{n+1}$, $97_1$, and $108_{n+1}$ which are located in the transmission path of the main signal, and the multiplying coefficients of the coefficient multipliers corresponding to the coefficient multipliers 113 and 135, are respectively selected to positive values. The multiplying coefficients of the coefficient multipliers corresponding to the other remaining coefficient multipliers, are respectively selected to negative values. In addition, the pre-emphasis circuit 140 and the de-emphasis circuit 141 may be constructed as shown in FIG. 6. Further, the pre-emphasis circuit 140 and the de-emphasis circuit 141 may have the construction corresponding to the blanks in the table given before.

In the case of the PAL system carrier chrominance signal, the phase of the chrominance subcarrier of one of the two kinds of color difference signals is reversed for every 1H. Hence, the delay times of the delay circuits 158, 165, $177_1$ through $177_n$, and $179_1$ through $179_{n-1}$ should each be selected to 2H in this case. The delay circuits may be constructed from a charge transfer element such as the CCD, and a clock pulse generator in this case.

The non-linear circuits 52, 59, 76, 111, 119, 133, 171, and 184 described heretofore, are not limited to the amplitude limiters.

Further, the present invention is not limited to these embodiments, but various variations and modifications may be made without departing from the scope of the present invention.

What is claimed is:

1. A recording and reproducing apparatus for recording a carrier chrominance signal, said apparatus comprising:

separating means for separating a carrier chrominance signal from a color video signal;

recording carrier chrominance signal processing means for converting the carrier chrominance signal into a carrier chrominance signal having a signal format suited for recording and reproduction;

recording means for recording an output signal of said recording carrier chrominance signal processing means on a recording medium;

reproducing means for reproducing the recorded signal from said recording medium;

reproduced carrier chrominance signal processing means for converting the reproduced signal from said reproducing means into a reproduced carrier chrominance signal having an original signal format; and de-emphasis circuit means responsive to the reproduced carrier chrominance signal from said reproduced carrier chrominance signal processing means, for subjecting the reproduced carrier chrominance signal to a de-emphasis so that a high-frequency component in a vertical spatial frequency of the reproduced carrier chrominance signal is relatively attenuated compared to a low-frequency component of the reproduced carrier chrominance signal.

2. A recording and reproducing apparatus as claimed in claim 1 which further comprises pre-emphasis circuit means responsive to the separated carrier chrominance signal from said separating means, for subjecting the separated carrier chrominance signal to a pre-emphasis complementary to the de-emphasis performed in said de-emphasis circuit means so that a high-frequency component in a vertical spatial frequency of the separated carrier chrominance signal is relatively emphasized compared to a low-frequency component of the separated carrier chrominance signal, and for supplying the pre-emphasized carrier chrominance signal to said recording carrier chrominance signal processing means.

3. A recording and reproducing apparatus as claimed in claim 2 in which said pre-emphasis circuit means has a linear pre-emphasis characteristic which is independent of the level of the separated carrier chrominance signal from said separating means, and said de-emphasis circuit means has a linear de-emphasis characteristic which is independent of the level of the reproduced carrier chrominance signal from said reproduced carrier chrominance signal processing means.

4. A recording and reproducing apparatus as claimed in claim 2 in which said pre-emphasis circuit means has a non-linear pre-emphasis characteristic which is dependent on the level of the separated carrier chrominance signal from said separating means so that a pre-emphasis quantity is relatively small with respect to a large level component compared to a small level component, and said de-emphasis circuit means has a non-linear de-emphasis characteristic which is dependent on the level of the reproduced carrier chrominance signal from said reproduced carrier chrominance signal processing means so that a de-emphasis quantity is relatively small with respect to a large level component compared to a small level component.

5. A recording and reproducing apparatus as claimed in claim 2 in which said pre-emphasis circuit means and said de-emphasis circuit means are constituted by a common circuit means, and said common circuit means comprises a differential amplifier for receiving the carrier chrominance signal by a non-inverting input terminal thereof, and for receiving an output signal of said de-emphasis circuit means by an inverting input terminal thereof through a first switch only at the time of a recording, switching means for supplying the carrier chrominance signal to the non-inverting input terminal of said differential amplifier and for supplying an output signal of said differential amplifier to an input terminal of said de-emphasis circuit means at the time of the recording, and for selectively supplying the reproduced carrier chrominance signal to the input terminal of said de-emphasis circuit means at the time of a reproduction, and a second switch for selectively producing the output signal of said differential amplifier through output terminal means at the time of the recording, and for selectively producing the output signal of said de-emphasis circuit means through said output terminal means at the time of the reproduction.

6. A recording and reproducing apparatus for recording a carrier chrominance signal, said apparatus comprising:

separating means for separating a carrier chrominance signal from a color video signal;

recording carrier chrominance signal processing means for frequency-converting the carrier chrominance signal into a low frequency band so as to produce a frequency converted carrier chrominance signal;

recording means for recording an output frequency converted carrier chrominance signal of said recording carrier chrominance signal processing means on a recording medium;

reproducing means for reproducing the recorded signal from said recording medium;

de-emphasis circuit means responsive to a reproduced frequency converted carrier chrominance signal from said reproducing means, for subjecting the reproduced frequency converted carrier chrominance signal to a de-emphasis so that a high-frequency component in a vertical spatial frequency of the reproduced frequency converted carrier chrominance signal is relatively attenuated compared to a low-frequency component of the reproduced frequency converted carrier chrominance signal; and reproduced carrier chrominance signal processing means for frequency-converting an output reproduced frequency converted carrier chrominahce signal of said de-emphasis circuit means into an original frequency band so as to produce a reproduced carrier chrominance signal.

7. A recording and reproducing apparatus as claimed in claim 6 which further comprises pre-emphasis circuit means resp to the frequency converted carrier chrominance signal from said recording carrier chrominance signal processing means, for subjecting the frequency converted carrier chrominance signal to a pre-emphasis complementary to the de-emphasis performed in said de-emphasis circuit means so that a high-frequency component in a vertical spatial frequency of the frequency converted carrier chrominance signal is relatively emphasized compared to a low-frequency component of the frequency converted carrier chrominance signal, and for supplying the pre-emphasized frequency converted carrier chrominance signal to said recording means.

8. A recording and reproducing apparatus as claimed in claim 7 in which said pre-emphasis circuit means has a linear pre-emphasis characteristic which is independent of the level of the frequency converted carrier chrominance signal from said recording carrier chrominance signal processing means, and said de-emphasis circuit means has a linear de-emphasis characteristic which is independent of the level of the reproduced frequency converted carrier chrominance signal from said reproducing means.

9. A recording and reproducing apparatus as claimed in claim 7 in which said pre-emphasis circuit means has a non-linear pre-emphasis characteristic which is dependent on the level of the frequency converted carrier chrominance signal from said recording carrier chrominance signal processing means so that a pre-emphasis quantity is relatively small with respect to a large level component compared to a small level component, and said de-emphasis circuit means has a non-linear de-emphasis characteristic which is dependent on the level of the reproduced frequency converted carrier chrominance signal from said reproducing means so that a de-emphasis quantity is relatively small with respect to a large level component compared to a small level component.

10. A recording and reproducing apparatus as claimed in claim 7 in which said pre-emphasis circuit means and said de-emphasis circuit means each comprise a delay circuit for delaying a signal by one horizontal scanning period or a natural number multiple of one horizontal scanning period, and said delay circuit comprises a clock pulse generator for generating clock pulses in phase with a horizontal synchronizing signal, and a charge transfer element having a delay time controlled responsive to the clock pulses from said clock pulse generator.

* * * * *